United States Patent
Nam et al.

(10) Patent No.: US 9,768,934 B2
(45) Date of Patent: Sep. 19, 2017

(54) METHOD AND SYSTEM FOR UPLINK ACKNOWLEDGEMENT SIGNALING IN CARRIER-AGGREGATED WIRELESS COMMUNICATION SYSTEMS

(71) Applicant: Samsung Electronics Co., Ltd., Suwon-si, Gyeonggi-do (KR)

(72) Inventors: Young-Han Nam, Plano, TX (US); Jianzhong Zhang, Plano, TX (US); Joonyoung Cho, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 14/732,151

(22) Filed: Jun. 5, 2015

(65) Prior Publication Data
US 2015/0288502 A1    Oct. 8, 2015

Related U.S. Application Data

(62) Division of application No. 13/047,557, filed on Mar. 14, 2011, now abandoned.
(Continued)

(51) Int. Cl.
*H04W 4/00* (2009.01)
*H04L 5/00* (2006.01)
(Continued)

(52) U.S. Cl.
CPC .......... *H04L 5/0055* (2013.01); *H04L 1/0027* (2013.01); *H04L 1/1854* (2013.01);
(Continued)

(58) Field of Classification Search
CPC ..... H04L 5/0055; H04L 5/001; H04L 5/0023; H04L 5/0053; H04L 1/0027; H04L 1/1854; H04W 72/0413; H04W 72/02
(Continued)

(56) References Cited

U.S. PATENT DOCUMENTS 8,108,757 B2 * 1/2012 Ahn et al. ............... 714/776
8,369,884 B2 * 2/2013 Ishii et al. ............... 455/522
(Continued)

FOREIGN PATENT DOCUMENTS

CN    101465720 A    6/2009
CN    101488832 A    7/2009
(Continued)

OTHER PUBLICATIONS

International Search Report dated Nov. 25, 2011 in connection with International Patent Application No. PCT/KR2011/002163.
(Continued)

*Primary Examiner* — Thai Hoang

(57) ABSTRACT

A base station includes a transmit path circuitry to transmit DL grant, data streams, and a control signal to configure a number of uplink transmit antenna ports PUCCH to a subscriber station. The base station also includes a receive path circuitry to receive ACK/NACK modulation in response to the data streams. If the subscriber station is configured to transmit ACK/NACK using one uplink transmit antenna port and channel selection with PUCCH format 1B, a modulation symbol is transmitted on one (PUCCH) i determined based at least partly upon a channel selection mapping table. If the subscriber station is configured to transmit ACK/NACK using two uplink transmit antenna ports and channel selection with PUCCH format 1B, the ACK/NACK modulation symbol is transmitted on two PUCCHs.

16 Claims, 24 Drawing Sheets

Related U.S. Application Data

(60) Provisional application No. 61/318,703, filed on Mar. 29, 2010, provisional application No. 61/384,081, filed on Sep. 17, 2010, provisional application No. 61/434,345, filed on Jan. 19, 2011.

(51) Int. Cl.
*H04L 1/00* (2006.01)
*H04L 1/18* (2006.01)
*H04W 72/02* (2009.01)
*H04W 72/04* (2009.01)

(52) U.S. Cl.
CPC ............ *H04L 5/001* (2013.01); *H04L 5/0023* (2013.01); *H04L 5/0053* (2013.01); *H04W 72/02* (2013.01); *H04W 72/0413* (2013.01)

(58) Field of Classification Search
USPC ......... 370/312, 335–338, 342–345; 455/101, 455/434, 450; 375/260–267
See application file for complete search history.

(56) References Cited

U.S. PATENT DOCUMENTS

| | | | |
|---|---|---|---|
| 2009/0204863 A1 | 8/2009 | Kim et al. | |
| 2009/0207797 A1* | 8/2009 | Shen et al. | 370/329 |
| 2010/0135273 A1* | 6/2010 | Kim | 370/344 |
| 2010/0172290 A1* | 7/2010 | Nam et al. | 370/328 |
| 2010/0291937 A1* | 11/2010 | Hu et al. | 455/450 |
| 2011/0080876 A1* | 4/2011 | Yin | H03M 13/6525 370/329 |
| 2011/0080880 A1* | 4/2011 | Yin | H04B 7/0682 370/329 |
| 2011/0090825 A1* | 4/2011 | Papasakellariou et al. | 370/280 |
| 2011/0092240 A1* | 4/2011 | Aiba et al. | 455/509 |
| 2011/0199997 A1* | 8/2011 | Wennstrom et al. | 370/329 |
| 2012/0093139 A1* | 4/2012 | Hooli et al. | 370/337 |
| 2012/0127950 A1* | 5/2012 | Chung et al. | 370/329 |

FOREIGN PATENT DOCUMENTS

| | | |
|---|---|---|
| JP | 2005-236686 A | 9/2005 |
| WO | WO 2009-130543 A1 | 10/2009 |
| WO | WO 2009-154540 A1 | 12/2009 |
| WO | 2010013963 A2 | 2/2010 |
| WO | 2010018977 A2 | 2/2010 |

OTHER PUBLICATIONS

Written Opinion of the International Searching Authority dated Nov. 25, 2011 in connection with International Patent Application No. PCT/KR2011/002163.
"Transmit Diversity for PUCCH Format 1a/1b with Dynamic Scheduling", Samsung, 3GPP TSG WG1 #60, Feb. 22-26, 2010, 3 pages.
"PUCCH resource indication for carrier aggregation and SORTD", Panasonic, 3GPP TSG RAN WG1 Meeting #60, Feb. 22-26, 2010, 9 pages.
"ACK/NACK transmission schemes for carrier aggregation", Panasonic, Feb. 22-26, 2010, 5 pages.
"PUCCH Format 1/1a/1b Resource Allocation with SORTD", CATT, 3GPP TSG RAN WG1 Meeting #60, Feb. 22-26, 2010, 2 pages.
Japan Office Action, dated Nov. 18, 2014, in connection with Japan Application No. 2013-502472, 9 pages.
Chinese Office Action, dated Oct. 8, 2014, in connection China Application No. 2011800172568, 9 pages.
"CCE Usage Restriction for TxD for PUCCH Format 1/1a/1b", Samsung, R1-100129, 3GPP TSG RAN WG1 #59bis, Valencia Spain, Jan. 18-22, 2010, 2 pages.
"Handling Problem With Uplink ACK/NACK Bundling", LG Electronics, R1-081256, 3GPP TSG RAN WG1 #52bis, Shenzhen, China, Mar. 31-Apr. 4, 2008, 4 pages.
"PUCCH Format 1/1a/1b Resource Allocation with Transmit Diversity", CATT, R1-100024, 3GPP TSG RAN WG1 Meeting #59bis, Valencia, Spain, Jan. 18-22, 2010, 4 pages.
"PUCCH Resource Allocation for Carrier Aggregation," 3GPP TSG RAN WG1 Meeting #60, R1-101417, Nokia Siemens Networks, Nokia, San Francisco, USA, Feb. 22-26, 2010, 5 pages.
"Resource Allocation for Multi-Antenna Transmission in PUCCH Format 1/1a/1b," 3GPP TSG RAN WG1 #59 bis, R1-100644, LG Electronics, Valencia, Spain, Jan. 18-22, 2010, 4 pages.
Foreign Communication From a Related Counterpart Application, Japanese Application No. 2013-502472, Notice of Patent Grant dated Aug. 10, 2015, 5 pages.
Foreign Communication From a Related Counterpart Application, European Application No. 11763009-1874, Extended European Search Report dated Feb. 10, 2017, 12 pages.

* cited by examiner

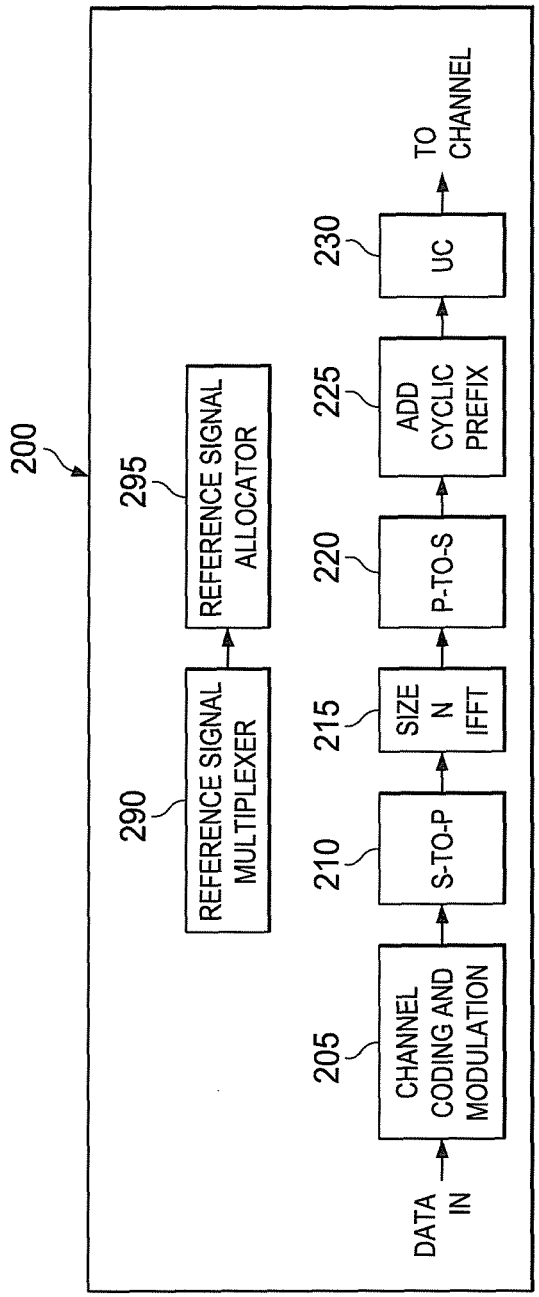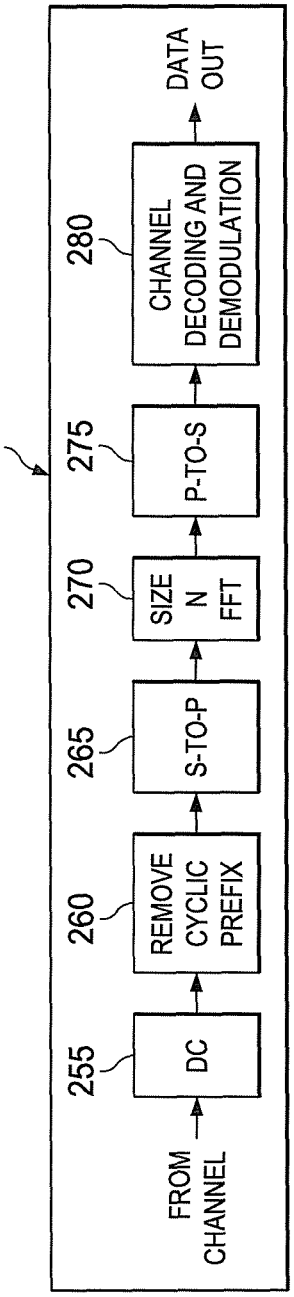

FIG. 6
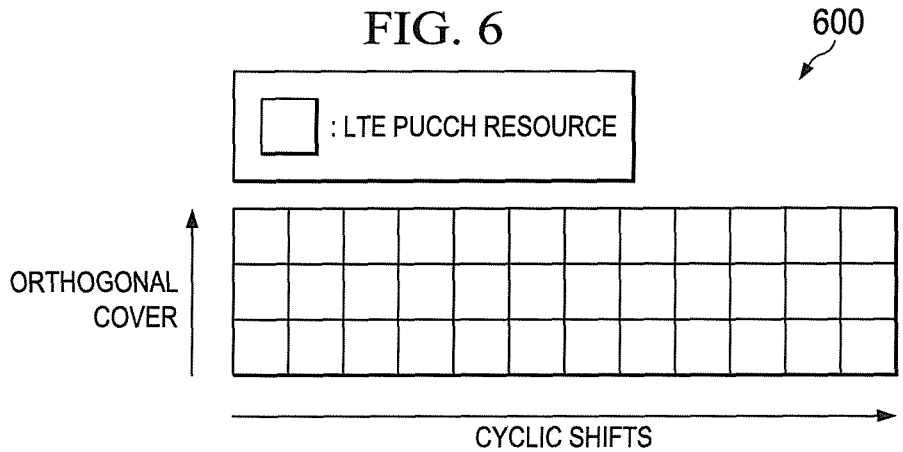
FIG. 7
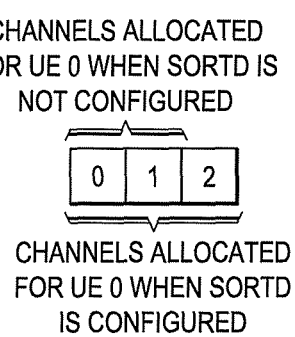
FIG. 10
| PUCCH FORMAT | $b(0),...,b(M_{bit}-1)$ | $d(0)$ |
|---|---|---|
| 1a | 0 | 1 |
|  | 1 | -1 |
| 1b | 00 | 1 |
|  | 01 | $-j$ |
|  | 10 | $j$ |
|  | 11 | -1 |

| NUMBER OF ACK/NACK SYMBOLS THAT WOULD BE CONVEYED IN A TRANSMISSION IN A SINGLE SUBFRAME, M | NUMBER OF ALLOCATED UPLINK CONTROL CHANNELS WHEN SORTD IS NOT CONFIGURED, $L_0$ | NUMBER OF ALLOCATED UPLINK CONTROL CHANNELS WHEN SORTD IS CONFIGURED, L |
|---|---|---|
| 1 | 1 | 2 |
| 2 | 2 | 3 |
| 3 | 3 | 3 |
| 4 | 4 | 4 |
| 5 | X | X |

| NUMBER OF ACK/NACK SYMBOLS THAT WOULD BE CONVEYED IN A TRANSMISSION IN A SINGLE SUBFRAME, M | NUMBER OF ALLOCATED UPLINK CONTROL CHANNELS WHEN SORTD IS NOT CONFIGURED, $L_0$ | NUMBER OF ALLOCATED UPLINK CONTROL CHANNELS WHEN SORTD IS CONFIGURED, L |
|---|---|---|
| 1 | 1 | 2 |
| 2 | 2 | 4 |
| 3 | 3 | 6 |
| 4 | 4 | 8 |
| 5 | X | 2X |

FIG. 11

| HARQ-ACK(0), HARQ-ACK(1) | $n^{(1)}_{PUCCH,i}$ | b(0),b(1) |
|---|---|---|
| ACK, ACK | $n^{(1)}_{PUCCH,1}$ | 1,1 |
| ACK, NACK/DTX | $n^{(1)}_{PUCCH,0}$ | 0,1 |
| NACK/DTX, ACK | $n^{(1)}_{PUCCH,1}$ | 0,0 |
| NACK/DTX, NACK | $n^{(1)}_{PUCCH,1}$ | 1,0 |
| NACK, DTX | $n^{(1)}_{PUCCH,0}$ | 1,0 |
| DTX, DTX | N/A | N/A |

| HARQ-ACK(0), HARQ-ACK(1), HARQ-ACK(2) | $n^{(1)}_{PUCCH,i}$ | b(0),b(1) |
|---|---|---|
| ACK, ACK, ACK | $n^{(1)}_{PUCCH,2}$ | 1,1 |
| ACK, ACK, NACK/DTX | $n^{(1)}_{PUCCH,1}$ | 1,1 |
| ACK, NACK/DTX, ACK | $n^{(1)}_{PUCCH,0}$ | 1,1 |
| ACK, NACK/DTX, NACK/DTX | $n^{(1)}_{PUCCH,0}$ | 0,1 |
| NACK/DTX, ACK, ACK | $n^{(1)}_{PUCCH,2}$ | 1,0 |
| NACK/DTX, ACK, NACK/DTX | $n^{(1)}_{PUCCH,1}$ | 0,0 |
| NACK/DTX, NACK/DTX, ACK | $n^{(1)}_{PUCCH,2}$ | 0,0 |
| DTX, DTX, NACK | $n^{(1)}_{PUCCH,2}$ | 0,1 |
| DTX, NACK, NACK/DTX | $n^{(1)}_{PUCCH,1}$ | 1,0 |
| NACK, NACK/DTX, NACK/DTX | $n^{(1)}_{PUCCH,0}$ | 1,0 |
| DTX, DTX, DTX | N/A | N/A |

| HARQ-ACK(0), HARQ-ACK(1), HARQ-ACK(2), HARQ-ACK(3) | $n_{PUCCH,i}^{(1)}$ | $b(0),b(1)$ |
|---|---|---|
| ACK, ACK, ACK, ACK | $n_{PUCCH,1}^{(1)}$ | 1,1 |
| ACK, ACK, ACK, NACK/DTX | $n_{PUCCH,1}^{(1)}$ | 1,0 |
| NACK/DTX, NACK/DTX, NACK,DTX | $n_{PUCCH,2}^{(1)}$ | 1,1 |
| ACK, ACK, NACK/DTX, ACK | $n_{PUCCH,1}^{(1)}$ | 1,0 |
| NACK, DTX, DTX, DTX | $n_{PUCCH,0}^{(1)}$ | 1,0 |
| ACK, ACK, NACK/DTX, NACK/DTX | $n_{PUCCH,1}^{(1)}$ | 1,0 |
| ACK, NACK/DTX, ACK, ACK | $n_{PUCCH,3}^{(1)}$ | 0,1 |
| NACK/DTX, NACK/DTX, NACK/DTX, NACK | $n_{PUCCH,3}^{(1)}$ | 1,1 |
| ACK, NACK/DTX, ACK, NACK/DTX | $n_{PUCCH,2}^{(1)}$ | 0,1 |
| ACK, NACK/DTX, NACK/DTX, ACK | $n_{PUCCH,0}^{(1)}$ | 0,1 |
| ACK, NACK/DTX, NACK/DTX, NACK/DTX | $n_{PUCCH,0}^{(1)}$ | 1,1 |
| NACK/DTX, ACK, ACK, ACK | $n_{PUCCH,3}^{(1)}$ | 0,1 |
| NACK/DTX, NACK, DTX, DTX | $n_{PUCCH,1}^{(1)}$ | 0,0 |
| NACK/DTX, ACK, ACK, NACK/DTX | $n_{PUCCH,2}^{(1)}$ | 1,0 |
| NACK/DTX, ACK, NACK/DTX, ACK | $n_{PUCCH,3}^{(1)}$ | 1,0 |
| NACK/DTX, ACK, NACK/DTX, NACK/DTX | $n_{PUCCH,1}^{(1)}$ | 0,1 |
| NACK/DTX, NACK/DTX, ACK, ACK | $n_{PUCCH,3}^{(1)}$ | 0,1 |
| NACK/DTX, NACK/DTX, ACK, NACK/DTX | $n_{PUCCH,2}^{(1)}$ | 0,0 |
| NACK/DTX, NACK/DTX, NACK/DTX, ACK | $n_{PUCCH,3}^{(1)}$ | 0,0 |
| DTX, DTX, DTX, DTX | N/A | N/A |

| INFORMATION ELEMENTS IN THE MAC CC ACTIVATION SIGNALING | EXPLANATION |
|---|---|
| 5 BIT BITMAP | EACH ENTRY IN THE 5 BIT BITMAP INDICATES WHETHER THE $k$-th CC OUT OF THE $K$ CONFIGURED CCs IS ACTIVATED OR NOT |
| ONE UPLINK RESOURCE INDEX $n_{PUCCH}$ | ONE UPLINK RESOURCE INDEX THAT WILL BE USED FOR ACK/NACK SIGNALING |
| OTHERS | |

| INFORMATION ELEMENTS IN THE MAC CC ACTIVATION SIGNALING | EXPLANATION | |
|---|---|---|
| | BIT FIELD MAPPED TO INDEX | AN ACTIVATED CC |
| A 2 BIT FIELD | 0 | THE FIRST CC OUT OF THE $K$ CONFIGURED CCs IS ACTIVATED BY THE MAC SIGNALING |
| | 1 | THE SECOND CC OUT OF THE $K$ CONFIGURED CCs IS ACTIVATED BY THE MAC SIGNALING |
| | 2 | THE THIRD CC OUT OF THE $K$ CONFIGURED CCs IS ACTIVATED BY THE MAC SIGNALING |
| | 3 | THE FOURTH CC OUT OF THE $K$ CONFIGURED CCs IS ACTIVATED BY THE MAC SIGNALING |
| ONE UPLINK RESOURCE INDEX $n_{PUCCH}$ | ONE UPLINK RESOURCE INDEX THAT WILL BE USED FOR ACK/NACK SIGNALING | |
| OTHERS | | |

(ACK, ACK) MAPPED TO TRANSMISSION OF q=-1 ON THE SECOND CHANNEL

|  | | SLOT 1 | SLOT 2 |
|---|---|---|---|
| SAME CS SAME OC | ANT1 | 1 | 1 |
|  | ANT2 | 1 | -1 |

PVS

|  | | SLOT 1 | SLOT 2 |
|---|---|---|---|
| SAME CS SAME OC | ANT1 | 1 | 0 |
|  | ANT2 | 0 | 1 |

TSTD

US 9,768,934 B2

METHOD AND SYSTEM FOR UPLINK ACKNOWLEDGEMENT SIGNALING IN CARRIER-AGGREGATED WIRELESS COMMUNICATION SYSTEMS

CROSS-REFERENCE TO RELATED APPLICATION(S) AND CLAIM OF PRIORITY

This application is a division of U.S. Non-Provisional patent application Ser. No. 13/047,557 filed Mar. 14, 2011 and entitled "METHOD AND SYSTEM FOR UPLINK ACKNOWLEDGEMENT SIGNALING IN CARRIER-AGGREGATED WIRELESS COMMUNICATION SYSTEMS," and claims priority to U.S. Provisional Patent Application No. 61/318,703 filed Mar. 29, 2010 and entitled "UL TRANSMIT DIVERSITY IN CARRIER-AGGREGATED WIRELESS COMMUNICATION SYSTEMS," U.S. Provisional Patent Application No. 61/384,081 filed Sep. 17, 2010 and entitled "UPLINK TRANSMIT DIVERSITY IN WIRELESS COMMUNICATION SYSTEMS," and U.S. Provisional Patent Application No. 61/434,345 filed Jan. 19, 2011 and entitled "UL ACKNOWLEDGEMENT SIGNALING IN CARRIER-AGGREGATED WIRELESS COMMUNICATION SYSTEMS." The above-referenced patent documents are hereby incorporated by reference into the present application as if fully set forth herein.

TECHNICAL FIELD

The present application relates generally to wireless communications and, more specifically, to a method and system for reference signal (RS) pattern design.

BACKGROUND

In 3$^{rd}$ Generation Partnership Project Long Term Evolution (3GPP LTE), Orthogonal Frequency Division Multiplexing (OFDM) is adopted as a downlink (DL) transmission scheme.

SUMMARY

A base station is provided. The base station includes a transmit path circuitry configured to transmit a downlink (DL) grant, data streams, and a control signal to configure a number of uplink transmit antenna ports for physical uplink control channel (PUCCH) to a subscriber station. The base station also includes a receive path circuitry configured to receive ACKnowledgement/Negative ACKnowledgement (ACK/NACK) from the subscriber station in response to the data streams. If the subscriber station is configured by the base station to transmit ACK/NACK using one uplink transmit antenna port and channel selection with PUCCH format 1B, a modulation symbol is transmitted on one physical uplink control channel (PUCCH) i determined based at least partly upon a channel selection mapping table. If the subscriber station is configured by the base station to transmit ACK/NACK using two uplink transmit antenna ports and channel selection with PUCCH format 1B, the ACK/NACK modulation symbol is transmitted on two PUCCHs. A first channel of the two PUCCHs is PUCCH i determined based at least partly upon the channel selection mapping table and a second channel of the two PUCCHs is determined implicitly by a function depending on at least one of i, L, and M, where L is a number of uplink control channels allocated for the subscriber station's ACK/NACK, and M is a number of ACK/NACK bits conveyed in a transmission in a subframe.

A method of operating a base station is provided. The method includes transmitting a downlink (DL) grant, data streams, and a control signal to configure a number of uplink transmit antenna ports for physical uplink control channel (PUCCH) to a subscriber station. The method also includes receiving ACKnowledgement/Negative ACKnowledgement (ACK/NACK) from the subscriber station in response to the data streams. If the subscriber station is configured by the base station to transmit ACK/NACK using one uplink transmit antenna port and channel selection with PUCCH format 1B, a modulation symbol is transmitted on one physical uplink control channel (PUCCH) i determined based at least partly upon a channel selection mapping table. If the subscriber station is configured by the base station to transmit ACK/NACK using two uplink transmit antenna ports and channel selection with PUCCH format 1B, the ACK/NACK modulation symbol is transmitted on two PUCCHs. A first channel of the two PUCCHs is PUCCH i determined based at least partly upon the channel selection mapping table and a second channel of the two PUCCHs is determined implicitly by a function depending on at least one of i, L, and M, where L is a number of uplink control channels allocated for the subscriber station's ACK/NACK, and M is a number of ACK/NACK bits conveyed in a transmission in a subframe.

A subscriber station is provided. The subscriber station includes a receive path circuitry configured to receive a downlink (DL) grant, data streams, and a control signal to configure a number of uplink transmit antenna ports for physical uplink control channel (PUCCH) from a base station. The subscriber station also includes a transmit path circuitry configured to transmit ACKnowledgement/Negative ACKnowledgement (ACK/NACK) to the base station in response to the data streams. If the subscriber station is configured by the base station to transmit ACK/NACK using one uplink transmit antenna port and channel selection with PUCCH format 1B, a modulation symbol is transmitted on one physical uplink control channel (PUCCH) i determined based at least partly upon a channel selection mapping table. If the subscriber station is configured by the base station to transmit ACK/NACK using two uplink transmit antenna ports and channel selection with PUCCH format 1B, the ACK/NACK modulation symbol is transmitted on two PUCCHs. A first channel of the two PUCCHs is PUCCH i determined based at least partly upon the channel selection mapping table and a second channel of the two PUCCHs is determined implicitly by a function depending on at least one of i, L, and M, where L is a number of uplink control channels allocated for the subscriber station's ACK/NACK, and M is a number of ACK/NACK bits conveyed in a transmission in a subframe.

A method of operating a subscriber station is provided. The method includes receiving a downlink (DL) grant, data streams, and a control signal to configure a number of uplink transmit antenna ports for physical uplink control channel (PUCCH) from a base station. The method includes transmitting ACKnowledgement/Negative ACKnowledgement (ACK/NACK) to the base station in response to the data streams. If the subscriber station is configured by the base station to transmit ACK/NACK using one uplink transmit antenna port and channel selection with PUCCH format 1B, a modulation symbol is transmitted on one physical uplink control channel (PUCCH) determined based at least partly upon a channel selection mapping table. If the subscriber station is configured by the base station to transmit ACK/NACK using two uplink transmit antenna ports and channel selection with PUCCH format 1B, the ACK/NACK modulation symbol is transmitted on two PUCCHs. A first channel of the two PUCCHs is PUCCH i determined based at least partly upon the channel selection mapping table and a second channel of the two PUCCHs is determined implicitly by a function depending on at least one of i, L, and M, where L is a number of uplink control channels allocated for the subscriber station's ACK/NACK, and M is a number of ACK/NACK bits conveyed in a transmission in a subframe.

A base station is provided. The base station includes a transmit path circuitry configured to transmit a downlink (DL) grant, data streams, and a control signal to configure a number of uplink transmit antenna ports for physical uplink control channel (PUCCH) to a subscriber station. The base station also includes a receive path circuitry configured to receive an ACKnowledgement/Negative ACKnowledgement (ACK/NACK) from the subscriber station in response to the data streams. If the subscriber station is configured by the base station to transmit ACK/NACK using two uplink transmit antenna ports and channel selection with PUCCH format 1B, the configuration of two uplink transmit antenna ports is overridden and the modulation symbol is mapped to only one PUCCH on one transmit antenna port. If the subscriber station is configured by the base station to transmit ACK/NACK using two uplink transmit antenna ports and PUCCH format 1A/1B, the modulation symbol is mapped onto two uplink transmit antenna ports on two PUCCHs.

A method of operating a base station is provided. The method includes transmitting a downlink (DL) grant, data streams, and a control signal to configure a number of uplink transmit antenna ports for physical uplink control channel (PUCCH) to a subscriber station. The method also includes receiving an ACKnowledgement/Negative ACKnowledgement (ACK/NACK) from the subscriber station in response to the data streams. If the subscriber station is configured by the base station to transmit ACK/NACK using two uplink transmit antenna ports and channel selection with PUCCH format 1B, the configuration of two uplink transmit antenna ports is overridden and the modulation symbol is mapped to only one PUCCH on one transmit antenna port. If the subscriber station is configured by the base station to transmit ACK/NACK using two uplink transmit antenna ports and PUCCH format 1A/1B, the modulation symbol is mapped onto two uplink transmit antenna ports on two PUCCHs.

A subscriber station is provided. The subscriber station includes a receive path circuitry configured to receive a downlink (DL) grant, data streams, and a control signal to configure a number of uplink transmit antenna ports for physical uplink control channel (PUCCH) from a base station. The subscriber station also includes a transmit path circuitry configured to transmit ACKnowledgement/Negative ACKnowledgement (ACK/NACK) to the base station in response to the data streams. If the subscriber station is configured by the base station to transmit ACK/NACK using two uplink transmit antenna ports and channel selection with PUCCH format 1B, the configuration of two uplink transmit antenna ports is overridden and the modulation symbol is mapped to only one PUCCH on one transmit antenna port. If the subscriber station is configured by the base station to transmit ACK/NACK using two uplink transmit antenna ports and PUCCH format 1A/1B, the modulation symbol is mapped onto two uplink transmit antenna ports on two PUCCHs.

A method of operating a subscriber station is provided. The method includes receiving a downlink (DL) grant, data streams, and a control signal to configure a number of uplink transmit antenna ports for physical uplink control channel (PUCCH) from a base station. The method includes transmitting ACKnowledgement/Negative ACKnowledgement (ACK/NACK) to the base station in response to the data streams. If the subscriber station is configured by the base station to transmit ACK/NACK using two uplink transmit antenna ports and channel selection with PUCCH format 1B, the configuration of two uplink transmit antenna ports is overridden and the modulation symbol is mapped to only one PUCCH on one transmit antenna port. If the subscriber station is configured by the base station to transmit ACK/NACK using two uplink transmit antenna ports and PUCCH format 1A/1B, the modulation symbol is mapped onto two uplink transmit antenna ports on two PUCCHs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a high-level diagram of an OFDMA transmitter according to one embodiment of the disclosure;

FIG. 3 is a high-level diagram of an OFDMA receiver according to one embodiment of the disclosure;

FIG. 6 illustrates a Physical Uplink Control CHannel (PUCCH) resource partition in one resource block in an uplink (UL) carrier in an LTE system according to an embodiment of this disclosure;

FIG. 7 illustrates an uplink control channel resource allocation for a particular UE depending on whether Spatial Orthogonal-Resource Transmit Diversity (SORTD) is configured or not according to an embodiment of this disclosure;

FIG. 8 illustrates a table that indicates the number of allocated uplink control channels when SORTD is configured according to an embodiment of this disclosure;

FIG. 9 illustrates a table that indicates the number of allocated uplink control channels when SORTD is configured according to another embodiment of this disclosure;

FIG. 10 illustrates a table depicting modulation symbol d(0) for Physical Uplink Control CHannel (PUCCH) formats 1a and 1b according to an embodiment of this disclosure;

FIG. 11 illustrates a table by which the value b(0),b(1) and the ACK/NACK resource $n_{PUCCH}^{(I)}$ are generated by channel selection for M=2 according to an embodiment of this disclosure;

FIG. 12 illustrates a table by which the value b(0), b(1) and the ACK/NACK resource $n_{PUCCH}^{(I)}$ are generated by channel selection for M=3 according to an embodiment of this disclosure;

FIG. 13 illustrates a table by which the value b(0), b(1) and the ACK/NACK resource $n_{PUCCH}^{(I)}$ are generated by channel selection for M=4 according to an embodiment of this disclosure;

FIG. 18A is a table depicting information elements (IEs) for Media Access Control component carrier (MAC CC) activation signaling according to an embodiment of this disclosure;

FIG. 18B is a table depicting IEs for (MAC CC activation signaling according to another embodiment of this disclosure;

DETAILED DESCRIPTION

FIGS. 1 through 38, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
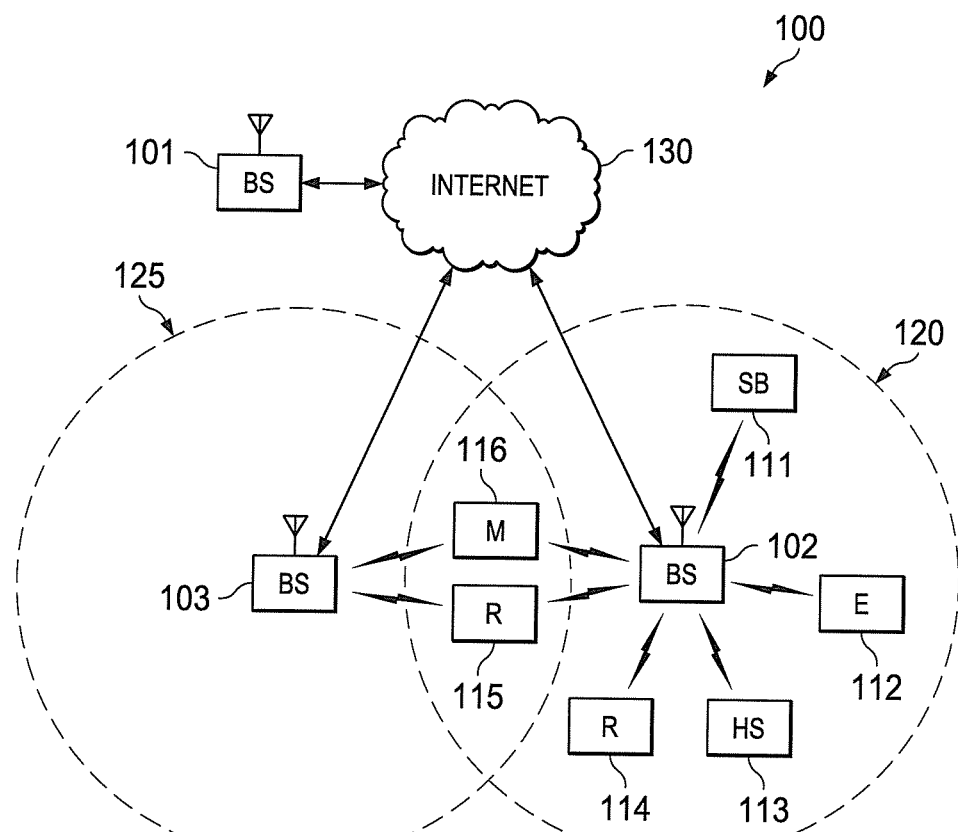
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2 is a high-level diagram of an Orthogonal Frequency Division Multiple Access (OFDMA) transmit path 200. FIG. 3 is a high-level diagram of an OFDMA receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using Code Division Multiplexing (CDM) or Time/Frequency Division Multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the System. In general, the number of subcarriers used for data is less than N because some subcarriers at the edge of the frequency spectrum are reserved as guard subcarriers. In general, no information is transmitted on guard subcarriers.

The time resources of an LTE system are partitioned into 10 millisecond (msec) frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

The transmitted signal in each downlink (DL) slot of a resource block is described by a resource grid of $N_{RB}^{DL}N_{SC}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where $k=0, \ldots, N_{RB}^{DL}N_{SC}^{RB}-1$ and $l=0, \ldots, N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure Channel Quality Information (CQI), Rank Information (RI) and Precoder Matrix Information (PMI) using DL RSs. Second, each UE demodulates the DL transmission signal intended for itself using the DL RSs. In addition, DL RSs are divided into three categories: cell-specific RSs, Multi-media Broadcast over a Single Frequency Network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission of Physical Downlink Shared CHannel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

Figure 4:
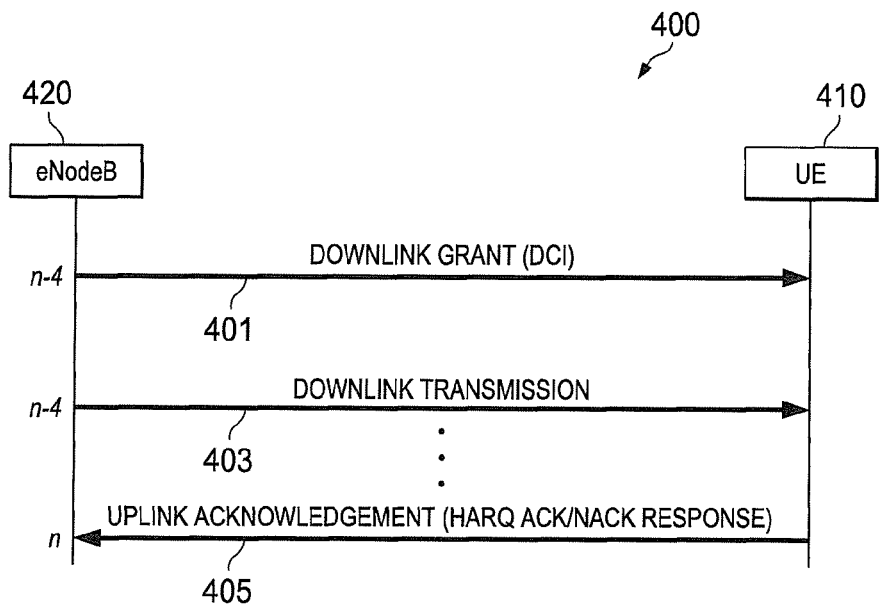
FIG. 4 illustrates a flow of messages between an enhanced Node B (eNodeB) and a user equipment (UE) according to an embodiment of this disclosure.

FIG. 4 illustrates a flow 400 of messages between an enhanced Node B (eNodeB) and a user equipment (UE) according to an embodiment of this disclosure.

As shown in FIG. 4, a DL transmission to a UE 410 is scheduled and initiated by an eNodeB 420. For a DL transmission in a subframe, the eNodeB 420 sends DL Control Information (DCI) to the UE 410 in a Physical DL Control CHannel (PDCCH) located in the first few OFDM symbols in the subframe (flow 401). The DCI indicates the allocated RBs for the UE 410 and other information. The eNodeB 420 also transmits a message to the UE 410 (flow 403). Upon receiving a DL grant targeted to itself, the UE 410 attempts to decode the transmitted message on the allocated RBs. Depending on the decoding results, the UE 410 is expected to send Hybrid Automatic Repeat reQuest (HARQ) bits (or uplink ACKnowledgement/Negative ACKnowledgement (ACK/NACK) bits) to the eNodeB 410 in a later subframe (flow 405). For example, in a Frequency-Division Duplex (FDD) system, ACK/NACK response in subframe n is for the decoding result in subframe n−1.

There are multiple formats of DCI used for different purposes. For example, one format is for downlink grant for a UE, another format is for uplink grant for a UE, and another format is for conveying common control information.

Figure 5:
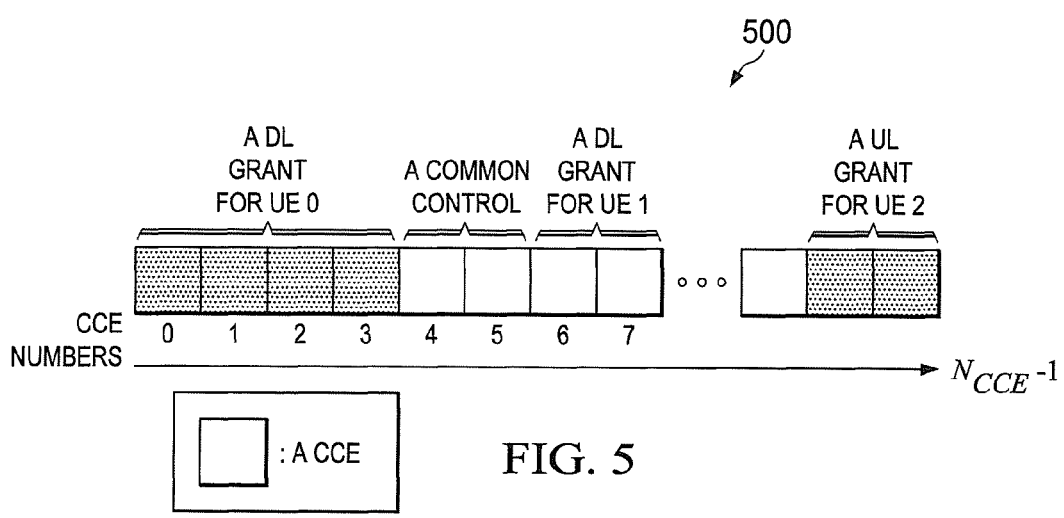
FIG. 5 illustrates Long Term Evolution (LTE) control channel elements (CCEs) in a downlink (DL) carrier according to an embodiment of this disclosure.

FIG. 5 illustrates Long Term Evolution (LTE) control channel elements (CCEs) in a downlink (DL) carrier 500 according to an embodiment of this disclosure.

A PDCCH that carries DCI is transmitted on an aggregation of one or several consecutive control channel elements (CCEs). The CCEs available in a DL carrier are numbered from 0 and $N_{CCE}-1$. FIG. 5 shows an illustration of CCE allocation, wherein CCEs 0 through 3 are used for a DL grant for UE 0; CCEs 6 to 7 are used for a DL grant for UE 1; CCEs 4 and 5 are used for a common control information for all UEs; and CCEs $N_{CCE}-2$ and $N_{CCE}-1$ are used for an UL grant for UE 2.

FIG. 6 illustrates a Physical Uplink Control CHannel (PUCCH) resource partition 600 in one resource block in an uplink (UL) carrier in an LTE system according to an embodiment of this disclosure.

In some embodiments, the uplink (UL) ACK/NACK (AN) bits are transmitted on PUCCH formats 1a and 1b. Resources used for transmission of PUCCH format 1a/1b are represented by the non-negative index $n_{PUCCH}^{(1)}$. PUCCH resource index $n_{PUCCH}^{(1)}$ determines an orthogonal cover (OC) and a cyclic shift (CS), and these two parameters indicate a unique resource. In the example shown in FIG. 6, there are 3×12=36 PUCCH AN resources available in a resource block.

As opposed to the LTE system which operates in a single contiguous bandwidth (or in a single carrier), the next generation communication systems (for example, LTE-Advanced and Worldwide Interoperability for Microwave Access (WiMax)) allow for aggregated multiple bandwidths and allow for a UE and an eNodeB to operate in the resultant aggregated carriers. The bandwidth aggregation can be symmetric or asymmetric. In the symmetric case, the number of component carriers (CCs) in the UL and the DL are the same. In the asymmetric case, the number of carriers in the UL and the DL can be different.

For acknowledging on multiple PDSCHs (e.g., in multiple subframes or in multiple DL component carriers (CCs)), two methods are considered, ACK/NACK bundling and ACK/NACK multiplexing.

The main motivation behind ACK/NACK bundling is to reduce the acknowledgement signaling overhead by reducing the number of bits transmitted in the signaling. One way of reducing the number of bits is to take a logical AND operation across the multiple ACK/NACK bits corresponding to multiple PDSCHs for each codeword. In a system where up to two codewords are allowed, this bundling would result in two bits for the acknowledgement signal.

The main motivation behind ACK/NACK multiplexing is to feed individual decoding results of PDSCHs back to an eNodeB. In some embodiments, spatial bundling is applied, implying that a logical AND operation is taken of ACK/NACK bits across codewords. As a result of spatial bundling, there are M ACK/NACK bits for acknowledging M PDSCHs, regardless of the number of codewords in each PDSCH transmission. After applying spatial bundling, a channel selection method is used for feeding multiple ACK/NACK bits back to the eNodeB. When a channel selection method is used for ACK/NACK multiplexing, both a selected PUCCH resource and a modulation symbol carried in the selected PUCCH resource convey information on multiple ACK/NACK bits. In particular, a UE transmits signals in only n PUCCH resources out of the N PUCCH resources, where n is a natural number less than or equal to M. Typical example values for n are 1 and 2. The M-bit information is jointly conveyed by the identity of the n selected channels (or PUCCH resources) and the signals transmitted in each of the n selected channels. In one example, when M=3-bit ACK/NACK information needs to be conveyed from a UE to an eNodeB, at least 8 ($=2^M=2^3$) codepoints are needed. By utilizing (n=1) channel selection out of (M=3) PUCCH resources, the identity of a selected PUCCH resource provides 3 codepoints. Furthermore, when a selected channel (or PUCCH resource) carries a QPSK signal, a 2-bit information (or 4 codepoints) can be transmitted in each selected PUCCH resource. In total, 12 (=3×12) codepoints are generated by this channel selection method, and 8 out of these 12 codepoints can be used to carry the 8 states associated with the 3 ACK/NACK bits.

In some cases, a UE is equipped with multiple transmit antennas, and is configured by an eNodeB to perform PUCCH transmit diversity. When the UE is scheduled a DL data (PDSCH) transmission in a subframe in only one DL CC by a DL grant, corresponding dynamic ACK/NACK are transmitted in a later subframe using two PUCCH resources in one UL CC, where the two PUCCH resources carry the identical signals for the ACK/NACK. Furthermore, the two PUCCH resources are transmitted on two uplink transmit antenna ports. This method of PUCCH transmit diversity is also known as Orthogonal Resource Transmission, or ORT (or spatial orthogonal resource transmission diversity, SORTD).

In an embodiment of this disclosure, M, the number of ACK/NACK symbols that would be conveyed in a transmission in a subframe, is determined by at least one of the following parameters: (1) the number of configured DL CCs, or N, (2) the number of activated DL CCs and (3) the number of DL CCs that have received PDSCHs in a previous subframe for which the UE sends an acknowledgement message in a current subframe. In some particular embodiments, M is determined from at least one of the three parameters listed below:

M is equal to the number of configured DL CCs, or N;
M is equal to the number of activated DL CCs; and
M is equal to the number of DL CCs that have received PDSCHs in a previous subframe for which the UE sends an acknowledgement message in a current subframe.

In an embodiment of this disclosure, for a UE configured with Spatial Orthogonal-Resource Transmit Diversity (SORTD), the number of allocated uplink control channels for the UE's acknowledgement for M DL CCs, denoted by L, is determined by a function of at least one of M and $L_0$. Here, $L_0$ denotes a number of uplink control channels allocated for the UE when SORTD is not configured. In particular embodiment, $L \geq L_0$ as this allows more channels to select from in case SORTD is configured. Furthermore, the L channels for the UE when SORTD is configured include the $L_0$ channels for the UE when SORTD is NOT configured. Here, an uplink control channel (or resource) is defined by a pair of a cyclic shift (CS) and an orthogonal cover code (OCC) located in an uplink physical resource block (UL PRB) as in Rel-8 LTE.

FIG. 7 illustrates an uplink control channel resource allocation 700 for a particular UE depending on whether Spatial Orthogonal-Resource Transmit Diversity (SORTD) is configured or not according to an embodiment of this disclosure.

In the embodiment shown in FIG. 7, $L_0$=2 and L=3. When SORTD is configured, channels 0, 1 and 2 are allocated for UE 0. When SORTD is not configured, only channels 0 and 1 are allocated for UE 0.

FIG. 8 illustrates a table 800 that indicates the number of allocated uplink control channels when SORTD is configured according to an embodiment of this disclosure.

As shown in table 500, for M=5, it is assumed that X uplink control channels are allocated for acknowledgement signaling of a UE configured not to do SORTD, where X is an integer. For example, X=8. It is noted that an L value in table 500 is a minimum number satisfying the following conditions:

Condition 1: $L \geq 2$ (i.e., there are at least two channels to do SORTD), and Condition 2: There are at least M possibilities to choose two circularly consecutive channels out of L channels. In particular embodiments, two channels are circularly consecutive if the two channel indices are consecutive, or the two channel indices are 0 and L−1, when the L channels are indexed with L consecutive integers, 0, 1, 2, ..., L−1.

FIG. 9 illustrates a table 900 that indicates the number of allocated uplink control channels when SORTD is configured according to another embodiment of this disclosure.

Another example function is shown in table 900, where the function is $L=2M=L_0$. In table 900, for M=5, it is assumed that X uplink control channels are allocated for acknowledgement signaling of a UE not configured to perform SORTD, where X is an integer.

In embodiments of this disclosure, a UE configured to perform SORTD and configured to transmit M ACK/NACK symbols in a subframe transmits one modulation symbol in two uplink control channels out of L (where $L \geq M$) allocated channels, where one uplink control channel is transmitted via one uplink antenna port, and the other uplink control channel is transmitted via another uplink antenna port (i.e., SORTD is implemented in the two selected channels). In a particular embodiment, for example, an uplink control channel is defined by a pair of a cyclic shift (CS) and an orthogonal cover code (OCC) located in an uplink physical resource block (UL PRB) as in Rel-8 LTE. The two channels for SORTD are selected by a rule, where the rule is defined by extending an ACK/NACK channel selection method for single-antenna transmissions. On the other hand, the modulation symbol transmitted in the two channels is identical to the modulation symbol transmitted in the ACK/NACK channel selection method for single-antenna transmissions.

For illustration of some example rules, the L channels are first indexed in an ascending order in ACK/NACK resource numbers: the lowest numbered channel in ACK/NACK resource numbers would be channel 0, the second lowest numbered channel in ACK/NACK resource numbers would be channel 1, and so on. An ACK/NACK message is then considered that can be conveyed by a selected channel i out of M channels, where i=0, 1, ..., M−1, and a QPSK symbol q transmitted in the selected channel, according to an ACK/NACK channel selection method with SORTD NOT being configured.

In one example rule, the two selected channels are i and (i+1)mod L.

In another example rule, the two selected channels are i and (i+M)mod L.

In another example rule, the two selected channels are i and (i−1)mod L.

Here, L channels can be allocated to a UE.

For Time-Division Duplex (TDD) ACK/NACK multiplexing and a subframe n with M>1, where M is the number of elements in the set K, spatial ACK/NACK bundling across multiple codewords within a DL subframe is performed by a logical AND operation of all the corresponding individual ACK/NACKs, and PUCCH format 1b with channel selection is used. For TDD ACK/NACK multiplexing and a subframe n with M=1, spatial ACK/NACK bundling across multiple codewords within a DL subframe is not performed, 1 or 2 ACK/NACK bits are transmitted using PUCCH format 1a or PUCCH format 1b, respectively.

FIG. 10 illustrates a table 1000 depicting modulation symbol d(0) for Physical Uplink Control CHannel (PUCCH) formats 1a and 1b according to an embodiment of this disclosure.

According to table 1000, a UE transmits b(0), b(1) on an ACK/NACK resource $n_{PUCCH}^{(l)}$ in sub-frame n using PUCCH format 1b.

FIG. 11 illustrates a table 1100 by which the value b(0), b(1) and the ACK/NACK resource $n_{PUCCH}^{(l)}$ are generated by channel selection for M=2 according to an embodiment of this disclosure.

FIG. 12 illustrates a table 1200 by which the value b(0), b(1) and the ACK/NACK resource $n_{PUCCH}^{(l)}$ are generated by channel selection for M=3 according to an embodiment of this disclosure.

FIG. 13 illustrates a table 1300 by which the value b(0), b(1) and the ACK/NACK resource $n_{PUCCH}^{(l)}$ are generated by channel selection for M=4 according to an embodiment of this disclosure.

Figure 14:
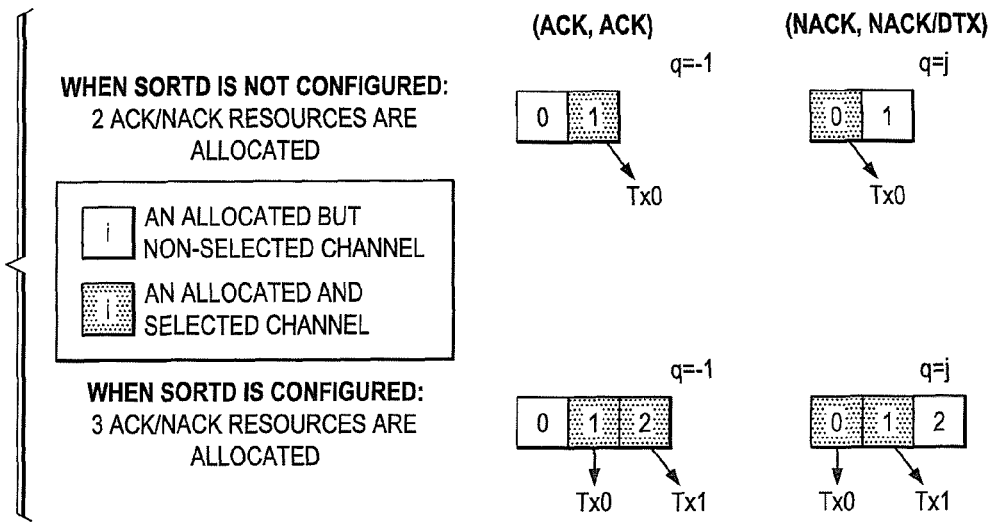
FIG. 14 illustrates an ACK/NACK mapping according to an embodiment of this disclosure.

FIG. 14 illustrates an ACK/NACK mapping 1400 according to an embodiment of this disclosure.

FIG. 14 illustrates an example of mapping an ACK/NACK message to selected channel(s) and a modulation symbol. In this particular embodiment, M=2 and L is 3 according to table 800, and two channels i and (i+1)mod L are selected using table 1100. As indicated by table 1100, when ACK,ACK is multiplexed, the first channel i is $n_{PUCCH,1}^{(l)}$ and the second channel is (1+1)mod 3 or $n_{PUCCH,2}^{(l)}$ When NACK,NACK/DTX is multiplexed, the first channel i is $n_{PUCCH,0}^{(l)}$ and the second channel is (0+1) Mod 3 or $n_{PUCCH,1}^{(l)}$.

Figure 15:
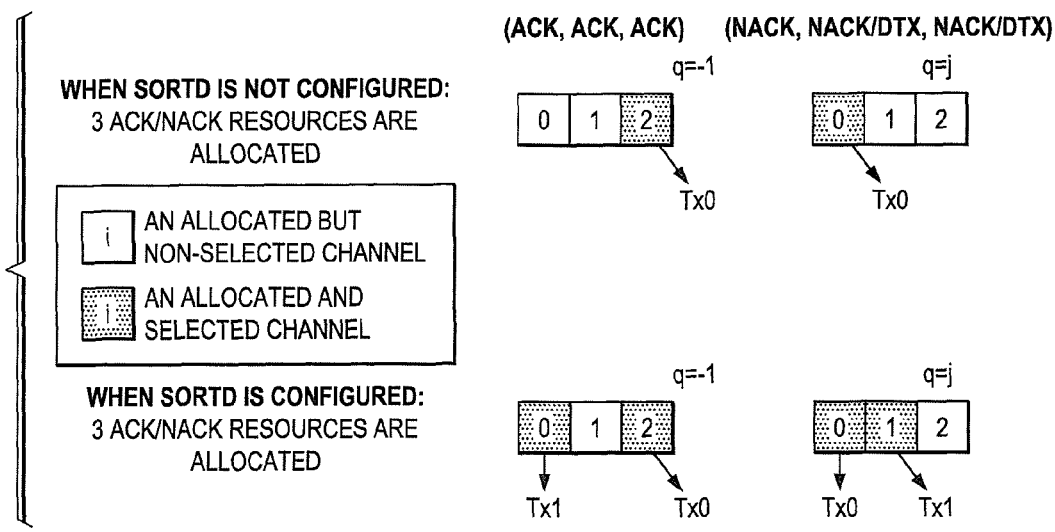
FIG. 15 illustrates an ACK/NACK mapping according to another embodiment of this disclosure.

FIG. 15 illustrates an ACK/NACK mapping 1500 according to another embodiment of this disclosure.

FIG. 15 illustrates an example of mapping an ACK/NACK message to selected channel(s) and a modulation symbol. In this particular embodiment, M=3 and L is 3 according to table 800, and two channels i and (i+1)mod L are selected using table 1200. As indicated by table 1200, when ACK,ACK,ACK is multiplexed, the first channel i is $n_{PUCCH,2}^{(l)}$ and the second channel is (2+1)mod 3 or $n_{PUCCH,0}^{(l)}$. When NACK,NACK/DTX,NACK/DTX is multiplexed, the first channel i is $n_{PUCCH,0}^{(l)}$ and the second channel is (0+1)mod 3 or $n_{PUCCH,1}^{(l)}$.

Figure 16:
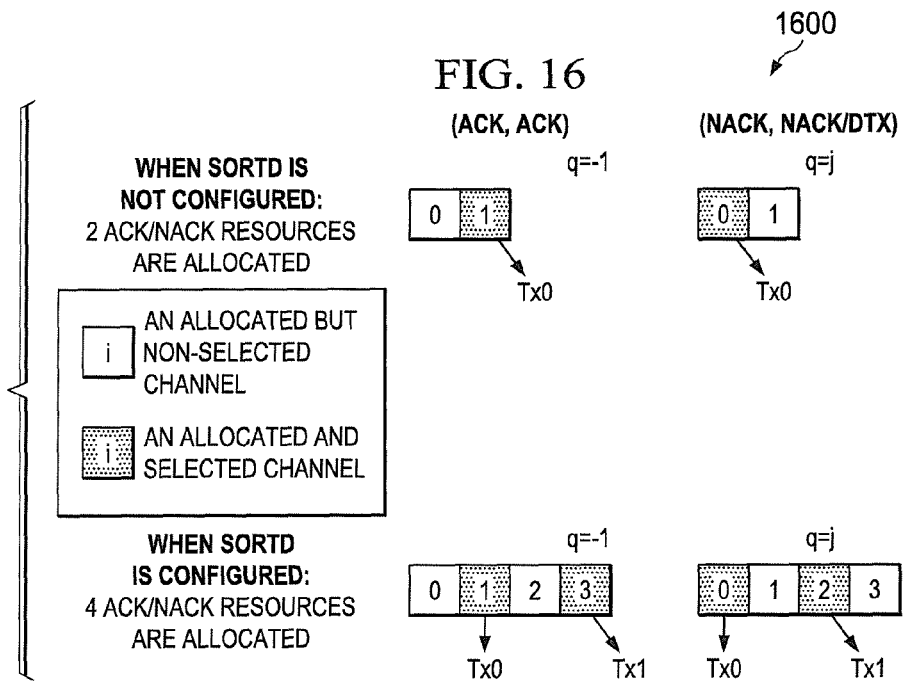
FIG. 16 illustrates an ACK/NACK mapping according to yet another embodiment of this disclosure.

FIG. 16 illustrates an ACK/NACK mapping 1600 according to yet another embodiment of this disclosure.

FIG. 16 shows an embodiment of mapping an ACK/NACK message to selected channel(s) and a modulation symbol when M=2 and L is 4 according to table 900. Two channels i and (i+M)mod L are selected using table 1100. As indicated by table 1100, when ACK,ACK is multiplexed, the first channel i is $n_{PUCCH,1}^{(l)}$ and the second channel is (1+2)mod 4 or $n_{PUCCH,3}^{(l)}$ When NACK,NACK/DTX is multiplexed, the first channel i is $n_{PUCCH,0}^{(l)}$ and the second channel is (0+2)mod 4 or $n_{PUCCH,2}^{(l)}$.

Figure 17:
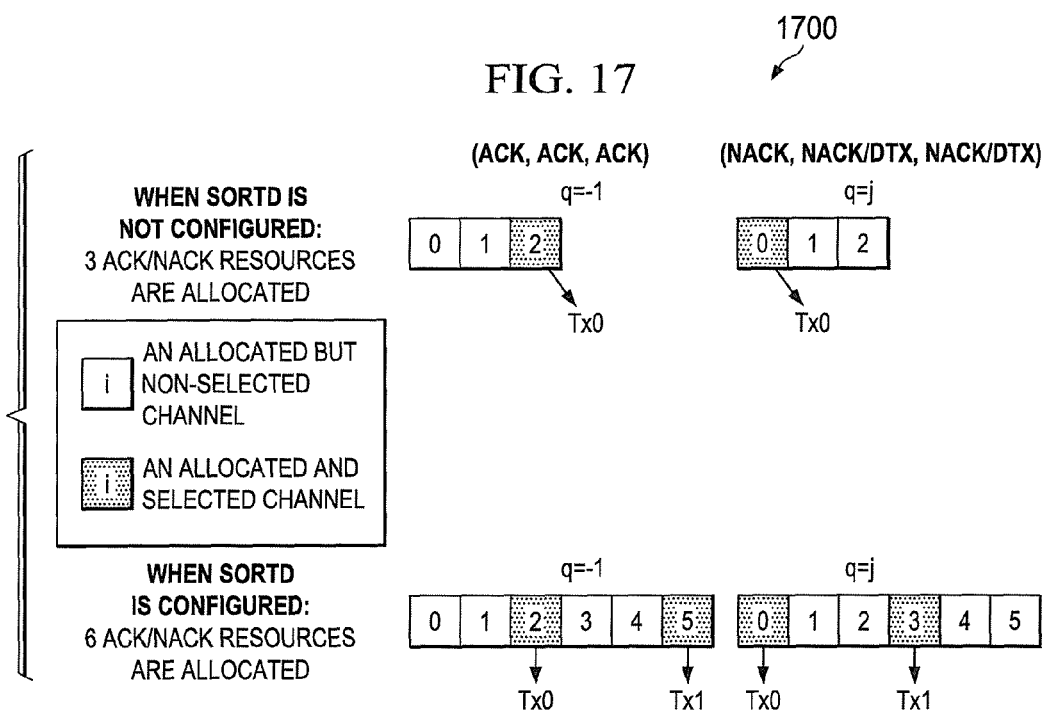
FIG. 17 illustrates an ACK/NACK mapping according to a further embodiment of this disclosure

FIG. 17 illustrates an ACK/NACK mapping 1700 according to a further embodiment of this disclosure.

In this particular embodiment, M=3 and L is 6 according to table 900, and two channels i and (i+M)mod L are selected using table 1200. As indicated by table 1200, when ACK,ACK,ACK is multiplexed, the first channel i is $n_{PUCCH,2}^{(l)}$ and the second channel is (2+3)mod 6 or $n_{PUCCH,5}^{(l)}$. When NACK,NACK/DTX,NACK/DTX is multiplexed, the first channel i is $n_{PUCCH,0}^{(l)}$ and the second channel is (0+3)mod 6 or $n_{PUCCH,3}^{(l)}$.

In some embodiments of this disclosure, L uplink control resources for ACK/NACK signal transmissions are allocated to each UE by an eNodeB using a semi-static allocation method. The eNodeB transmits an information element about one uplink resource index, $n_{PUCCH}$, in a higher-layer signaling. Each of the L resource indices are then derived from a function of at least one of the one uplink resource index $n_{PUCCH}$, a separately signalled component carrier (CC)-common resource offset $N_{PUCCH}^{(l)}$, and L.

In some embodiments, when M CCs are activated for the UE, the L number is derived by a relation between M and L, where some example relations are shown in table 800 and table 900.

In some embodiments, the higher-layer signaling is a Radio Resource Control component carrier (RRC CC) configuration signaling to the UE. Upon receiving the one uplink resource index, the UE finds L consecutive uplink control resources starting from the one uplink resource index $n_{PUCCH}$, for the L uplink control resources for ACK/NACK signal transmissions. In a particular embodiment, each of the L index numbers for the PUCCH ACK/NACK resources are determined by Equation 1 below:

$$n_{PUCCH,l}^{(1)} = n_{PUCCH} + N_{PUCCH}^{(l)} + N_{offset,l}, \; l=1,2,\ldots,L, \quad \text{[Eqn. 1]}$$

where $N_{offset,l} = l-1$. For example, when L=4, the one signalled uplink resource index is used for determining L=4 resources.

In some embodiments, the higher-layer signaling is a Media Access Control (MAC) component carrier (CC) activation signaling to the UE. For ease of description, it is assumed that the UE is configured by an RRC CC configuration signaling to receive PDSCHs from K CCs, where K≤5. In addition, it is assumed that $M_1$ CCs are activated in subframe n−1. Via the MAC CC activation signaling transmitted in subframe n, an M number of CCs out of K configured CCs are activated for the UE in several subframes after subframe n.

FIG. 18A is a table 1800 depicting information elements (IEs) for Media Access Control component carrier (MAC CC) activation signaling according to an embodiment of this disclosure.

In a particular embodiment of the MAC CC activation signaling, the eNodeB also indicates the identities of CCs that will be activated by the MAC CC activation signaling, where the IEs for this MAC CC activation signaling are listed in table 1800. This can be done by a 5-bit bitmap information element (IE), where the k-th element indicates whether the k-th CC out of the K configured CCs is activated or not. For example, when k-th entry in the K-bit bitmap is one, the k-th CC is activated; on the other hand, when k-th entry in the 5 bit bitmap is zero, the k-th CC is de-activated. In this case, M number would be the same as the number of entries having one in the K-bit bitmap. Once the UE successfully decodes the MAC CC activation signaling, the UE finds L consecutive uplink control resources starting from the one uplink resource index $n_{PUCCH}$. In this case, each of the L index numbers for the PUCCH ACK/NACK resources are determined by Equation 2 below:

$$n_{PUCCH,l}^{(1)}=n_{PUCCH}+N_{PUCCH}^{(l)}+N_{offset,l}, \quad l=1,2,\ldots,L,$$ [Eqn. 2]

where $N_{offset,l}=l-1$. For example, when L=4, the one signalled uplink resource index $n_{PUCCH}$ is used for determining L=4L=4 resources.

FIG. 18B is a table 1810 depicting IEs for (MAC CC activation signaling according to another embodiment of this disclosure.

In another embodiment of the MAC CC activation signaling, the eNodeB also indicates an identity of one CC that will be activated by the MAC CC activation signaling, where IEs for this MAC CC activation signaling are listed in table 1810. This can be done by a 2-bit information element (IE), in which each state from the 2-bit field activates a CC according to table 1810. In this case, M number would be equal to $M_1+1$. Once the UE successfully decodes the MAC CC activation signaling, the UE finds additional consecutive uplink control resources using the one uplink resource index $n_{PUCCH}$. When it is assumed that the UE has been allocated $L_1$ uplink control resources for the $M_1$ activated CCs, the additional $L-L_1$ index numbers for the PUCCH ACK/NACK resources newly allocated by the MAC activation signaling are determined by Equation 3 below:

$$n_{PUCCH,l}^{(1)}=n_{PUCCH}+N_{PUCCH}^{(l)}+N_{offset,l}, \quad l=1,2,\ldots, L-L_1,$$ [Eqn. 3]

where $N_{offset,l}=l-1$. For example, when L=4 and $L_1=2$, the one signalled uplink resource index $n_{PUCCH}$ is used for determining 2 ($=L-L_1$) additional resources.

In some embodiments of this disclosure, when $M_2$ CCs are deactivated out of M allocated CCs ($M_2 \le M$), $L_2$ uplink control resources are de-allocated from L previously allocated uplink control resources.

In one embodiment, $L_2$ largest-numbered uplink control resources out of L previously allocated uplink control resources are released (or de-allocated).

In another example method, $L_2$ smallest-numbered uplink control resources out of L previously allocated uplink control resources are released (or de-allocated).

In embodiments of this disclosure, a UE determines up to A uplink control channels for each Tx antenna port to convey an A-bit HARQ-ACK message using a channel selection scheme. Here, an uplink control channel (or resource) is defined by at least one of a cyclic shift (CS) and an orthogonal cover code (OCC) located in an uplink physical resource block (UL PRB), for example, PUCCH format 1a/1b in Rel-8 LTE.

The A uplink control channels for a first antenna port $p_0$ are denoted by $n_{PUCCH,i}^{(1,p=p_0)}$, i=0, . . . , A-1.

The A uplink control channels for a second antenna port $p_1$ are denoted by $n_{PUCCH,i}^{(1,p=p_1)}$, i=0, . . . , A-1.

A UE is configured to transmit HARQ-ACK using channel selection on two antenna ports (or configured to do SORTD). In order for the UE to transmit a HARQ-ACK message mapped to a selected channel i and a QPSK symbol q on the selected channel according to a mapping table (e.g., table 1100, table 1200 and table 1300), the UE selects channel i from the A uplink control channels determined for each antenna port, and transmits a QPSK symbol q on each antenna port.

Figures 19, 23A, 23B:
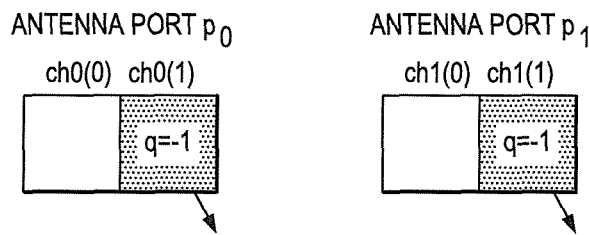
FIG. 19 illustrates a HARQ-ACK message transmission when two antennas are configured according to an embodiment of this disclosure.
FIGS. 23A and 23B illustrate data transmission over two antennas using slot-based precoding vector switching (PVS) or time switched transmit diversity (TSTD) according to an embodiment of this disclosure.

FIG. 19 illustrates a HARQ-ACK message transmission 1900 when two antennas are configured according to an embodiment of this disclosure.

As shown in FIG. 19, a UE determines two resources for each antenna port: ch0(0=$n_{PUCCH,0}^{(1,p=p_0)}$ and ch0(1)=$n_{PUCCH,1}^{(1,p=p_0)}$ for antenna port $p_0$, and ch1(0)=$n_{PUCCH,0}^{(1,p=p_1)}$ and ch1(1)=$n_{PUCCH,1}^{(1,p=p_1)}$ for antenna port $p_1$. In a particular embodiment, it is assumed that the UE transmits a HARQ-ACK message (ACK,ACK) according to the mapping in table 1100. As a HARQ-ACK message (ACK,ACK) is mapped onto a transmission of a QPSK symbol q=-1 on the second channel in table 1100, the UE transmits q=-1 on the two channels: ch0(1) on antenna port $p_0$ and ch1(1) on antenna port $p_1$.

In embodiments of this disclosure, a UE is configured to receive from a primary cell (or PCC) and a secondary cell (or SCC). The transmission modes configured for the PCC and SCC are such that up to $N_1$ and $N_2$ TBs can be transmitted in the PCC and in the SCC, respectively. The UE then reports A ($=N_1+N_2$) HARQ-ACK bits using a channel selection scheme in each subframe where the UE is scheduled a HARQ-ACK transmission. In a particular embodiment, $N_1, N_2 \in \{1,2\}$.

In this case, the A uplink control channels to be used for a channel selection scheme on each antenna port can be found as follows:

1. A ($=N_1+N_2$) uplink control channels to be used by the first Tx antenna port $p=p_0$, $\{n_{PUCCH,i}^{(1,p=p_0)}\}$ are found by the UE as follows:

For a PDSCH transmission indicated by the detection of a corresponding PDCCH in subframe n-4 on the primary cell, or for a PDCCH indicating downlink SPS release in subframe n-4 on the primary cell, the PUCCH resources are determined as follows:

When the PDSCH transmission is on the primary cell, $$n_{PUCCH,i}^{(1,p=p_0)}=n_{CCE}+i+N_{PUCCH}^{(l)}, \text{ where } i \in \{0,\ldots,N_1-1\},$$

where $n_{CCE}$ is the smallest CCE number used for the transmission of the corresponding DCI assignment and $N_{PUCCH}^{(l)}$ is configured by higher layers.

When the PDSCH transmission is on the secondary cell, $$n_{PUCCH,i}^{(1,p=p_0)}=n_{CCE}+i-N_1+N_{PUCCH}^{(l)}, \text{ where } i \in \{N_1,\ldots,A-1\},$$

where $n_{CCE}$ is the smallest CCE number used for the transmission of the corresponding DCI assignment and $N_{PUCCH}^{(l)}$ is configured by higher layers.

For a PDSCH transmission indicated by the detection of a corresponding PDCCH in subframe n-4 on the secondary cell, the value of $n_{PUCCH,i}^{(1,p=p_0)}$ is determined according to higher layer configuration, where $i \in \{N_1, \ldots, A-1\}$.

2. A ($=N_1+N_2$) uplink control channels to be used by the second Tx antenna port $p=p_1$, $\{n_{PUCCH,i}^{(1,p=p_1)}\}$ are found by the UE as a function of at least one of $n_{CCE}$, $N_{PUCCH}^{(l)}$, $\{n_{PUCCH,i}^{(1,p=p_0)}\}$ and AA.

Below are some example functions determining the $\{n_{PUCCH,i}^{(1,p=p_1)}\}$ from at least one of $n_{CCE}$, $N_{PUCCH}^{(l)}$, $\{n_{PUCCH,i}^{(1,p=p_0)}\}$ and A:

Example Function 1

$\{n_{PUCCH,i}^{(1,p=p_1)}\}$ is an offset larger than $\{n_{PUCCH,i}^{(1,p=p_0)}\}$. In other words, $$\{n_{PUCCH,i}^{(1,p=p_1)}\}=\{n_{PUCCH,i}^{(1,p=p_0)}\}+n_{offset}, \forall i.$$

Here, $n_{offset}$ is a positive integer. In one example, $n_{offset}=1$. In another example, $n_{offset}=2$.

Figure 20:
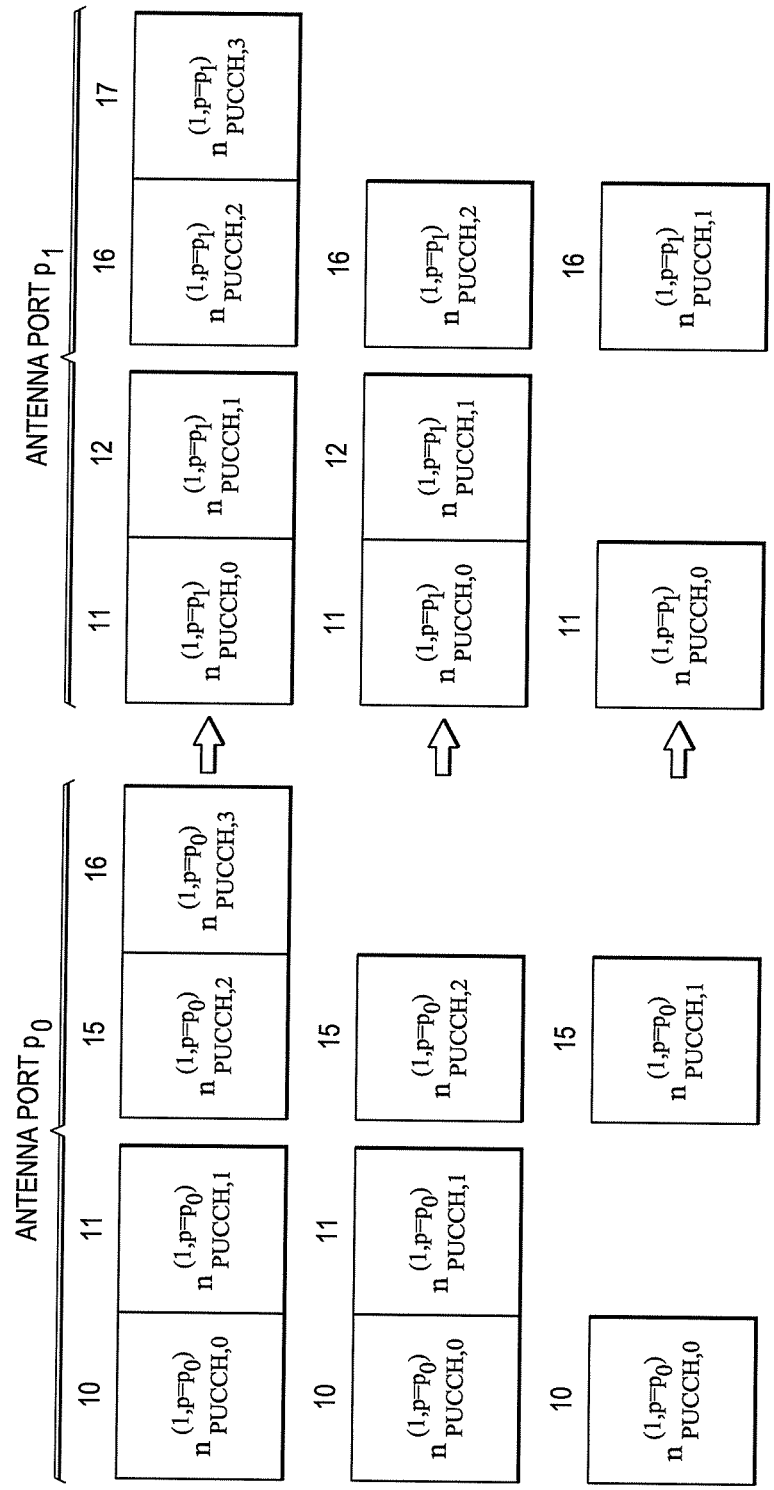
FIG. 20 illustrates a determination of a second set of control channels for antenna port $p_1$ according to an embodiment of this disclosure.

FIG. 20 illustrates a determination 2000 of a second set of control channels for antenna port $p_1$ according to an embodiment of this disclosure.

In the embodiment shown in FIG. 20, $n_{offset}=1$. For example, when uplink control channels 10, 11, 15 and 16 are determined for antenna port $p_0$, then uplink control channels 11, 12, 16 and 17 are determined for antenna port $p_1$. In this case, the uplink control channels that the eNodeB has to monitor to decode a HARQ-ACK message are 10, 11, 12, 15, 16 and 17. In other words, the eNodeB has to assign 6 uplink control channels for the UE.

Example Function 2

The i-th channel $n_{PUCCH,i}^{(1,\tilde{p}=p1)}$ for the second Tx antenna is the same as the $((i+n_{offset}) \bmod A)$-th channel for the first antenna. In other words, $$n_{PUCCH,i}^{(1,\tilde{p}=p1)} = n_{PUCCH,(i+n_{offset}) \bmod A}^{(1,\tilde{p}=p0)}, \forall i.$$

Example Function 3

For A>2, the i-th channel $n_{PUCCH,i}^{(1,\tilde{p}=p1)}$ for the second Tx antenna is the same as the $((i+n_{offset}) \bmod A)$-th channel for the first antenna. In other words, $$n_{PUCCH,i}^{(1,\tilde{p}=p1)} = n_{PUCCH,(i+n_{offset}) \bmod A}^{(1,\tilde{p}=p0)}, \forall i, A>2.$$

On the other hand, for A=2, the first channel for the second Tx antenna is determined by $n_{PUCCH,0}^{(1,\tilde{p}=p1)} = n_{PUCCH,1}^{(1,\tilde{p}=p0)}$ while the second channel for the second Tx antenna is determined by $n_{PUCCH,1}^{(1,\tilde{p}=p1)} = n_{PUCCH,1}^{(1,\tilde{p}=p0)}$. Here, $n_{offset}$ is a positive integer. In one example, $n_{offset}=1$. In another example, $n_{offset}=2$.

If $n_{PUCCH,i}^{(1,\tilde{p}=p1)} = n_{PUCCH,(i+n_{offset}) \bmod A}^{(1,\tilde{p}=p0)}, \forall i$ are applied for A=2, $n_{PUCCH,0}^{(1,\tilde{p}=p1)} = n_{PUCCH,0}^{(1,\tilde{p}=p0)}$ and $n_{PUCCH,1}^{(1,\tilde{p}=p1)} = n_{PUCCH,0}^{(1,\tilde{p}=p0)}$. Suppose that a QPSK symbol q sent on $n_{PUCCH,0}^{(1,\tilde{p}=p0)}$ and the same QPSK symbol q sent on $n_{PUCCH,1}^{(1,\tilde{p}=p0)}$ mean two different HARQ-ACK messages. Then, according to $n_{PUCCH,0}^{(1,\tilde{p}=p1)} = n_{PUCCH,1}^{(1,\tilde{p}=p0)}$ and $n_{PUCCH,1}^{(1,\tilde{p}=p1)} = n_{PUCCH,0}^{(1,\tilde{p}=p0)}$, the two different HARQ-ACK messages are transmitted identically, and q is sent on two channels $n_{PUCCH,0}^{(1,\tilde{p}=p0)}$ and $n_{PUCCH,1}^{(1,\tilde{p}=p0)}$. To avoid this situation, a non-overlapping control channel is assigned for the second Tx antenna, i.e., $n_{PUCCH,1}^{(1,\tilde{p}=p1)} = n_{PUCCH,1}^{(1,\tilde{p}=p0)} + n_{offset}$.

Figure 21:
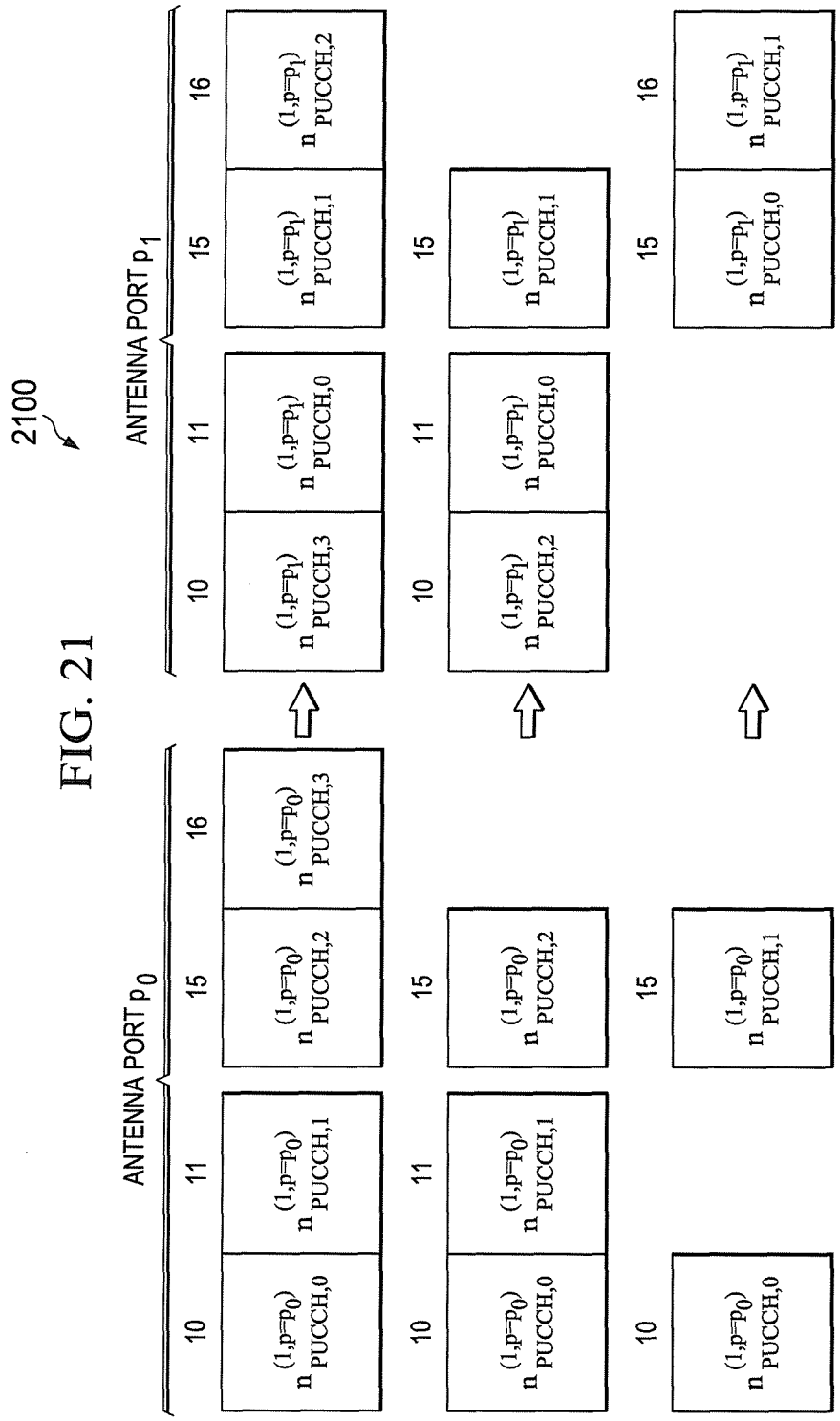
FIG. 21 illustrates a determination of a second set of control channels for antenna port $p_1$ according to another embodiment of this disclosure.

FIG. 21 illustrates a determination 2100 of a second set of control channels for antenna port $p_1$ according to another embodiment of this disclosure.

In FIG. 21, $n_{offset}=1$. For example, when uplink control channels 10, 11, 15 and 16 are determined for antenna port $p_0$, then uplink control channels 10, 11, 15 and 16 are determined for antenna port $p_1$. In this case, the uplink control channels that the eNodeB has to monitor to decode a HARQ-ACK message are 10, 11, 15 and 16. In other words, the eNodeB has to assign 4 uplink control channels for the UE.

This method may or may not be applicable depending on whether the control channels for antenna port $p_0$, $n_{PUCCH,0}^{(1,\tilde{p}=p0)}, \ldots, n_{PUCCH,A}^{(1,\tilde{p}=p0)}$, are dynamically allocated or semi-statically allocated. When the control channels for antenna port $p_0$ are semi-statically allocated, the UE knows all the A channels for antenna port $p_0$ in any of the subframes the UE transmits HARQ-ACK. Hence, the UE can always apply the cyclic-shift operation illustrated in FIG. 21 to determine the channels for antenna port $p_1$, $n_{PUCCH,0}^{(1,\tilde{p}=p1)}, \ldots, n_{PUCCH,A}^{(1,\tilde{p}=p1)}$. However, when the control channels for antenna port $p_0$ are dynamically allocated, e.g., by the CCE number of a corresponding PDCCH, the UE sometimes does not know some of those control channels when the UE does not successfully decode at least one downlink grant. For example, suppose that the eNodeB transmits 2 DL grants, but the UE misses the second DL grant. If it is further assumed that the UE is configured with Single Input Multiple Output (SIMO) modes in both the PCC and the SCC, then the UE knows $n_{PUCCH,0}^{(1,\tilde{p}=p0)}$ but does not know $n_{PUCCH,1}^{(1,\tilde{p}=p0)}$. According to this embodiment, in this case, the UE cannot determine $n_{PUCCH,0}^{(1,\tilde{p}=p0)}$ as the UE does not know $n_{PUCCH,1}^{(1,\tilde{p}=p0)}$. To resolve this issue, the next example function (denoted as example function 4) is considered.

Example Function 4

The channels for the second antenna port are determined based on the HARQ-ACK payload in a HARQ-ACK message.

When A=4, the other channels for the second antenna port are determined based on Equation 4 below:

$$n_{PUCCH,i}^{(1,\tilde{p}=p1)} = n_{PUCCH,(i+n_{offset}) \bmod A}^{(1,\tilde{p}=p0)}, \forall i \quad [\text{Eqn. 4}]$$

When A=3, one additional channel is determined for the second antenna port, where the additional channel is located next to a channel for the first antenna port determined for a cell with 1-TB transmission mode. The other channels for the second antenna port are determined based on Equation 4.

When $N_1=1$ and $N_2=2$ (A=3), $$n_{PUCCH,0}^{(1,\tilde{p}=p1)} = n_{PUCCH,0}^{(1,\tilde{p}=p0)} + n_{offset}, \text{ and}$$

$$n_{PUCCH,i}^{(1,\tilde{p}=p1)} = n_{PUCCH,(n_{offset}+1) \bmod A}^{(1,\tilde{p}=p0)}, i \in \{1, 2\}.$$

When $N_1=2$ and $N_2=1$ (A=3), $$n_{PUCCH,i}^{(1,\tilde{p}=p1)} = n_{PUCCH,i+1}^{(1,\tilde{p}=p0)}, i \in \{0,1\}, \text{ and}$$

$$n_{PUCCH,2}^{(1,\tilde{p}=p1)} = n_{PUCCH,2}^{(1,\tilde{p}=p0)} + 1.$$

When A=2, two additional channels are determined for the second antenna port, where each of the two additional channels is located next to a channel for the first antenna port determined for each cell:

$$n_{PUCCH,i}^{(1,\tilde{p}=p1)} = n_{PUCCH,i}^{(1,\tilde{p}=p0)} + 1, i \in \{0,1\}.$$

Figure 22:
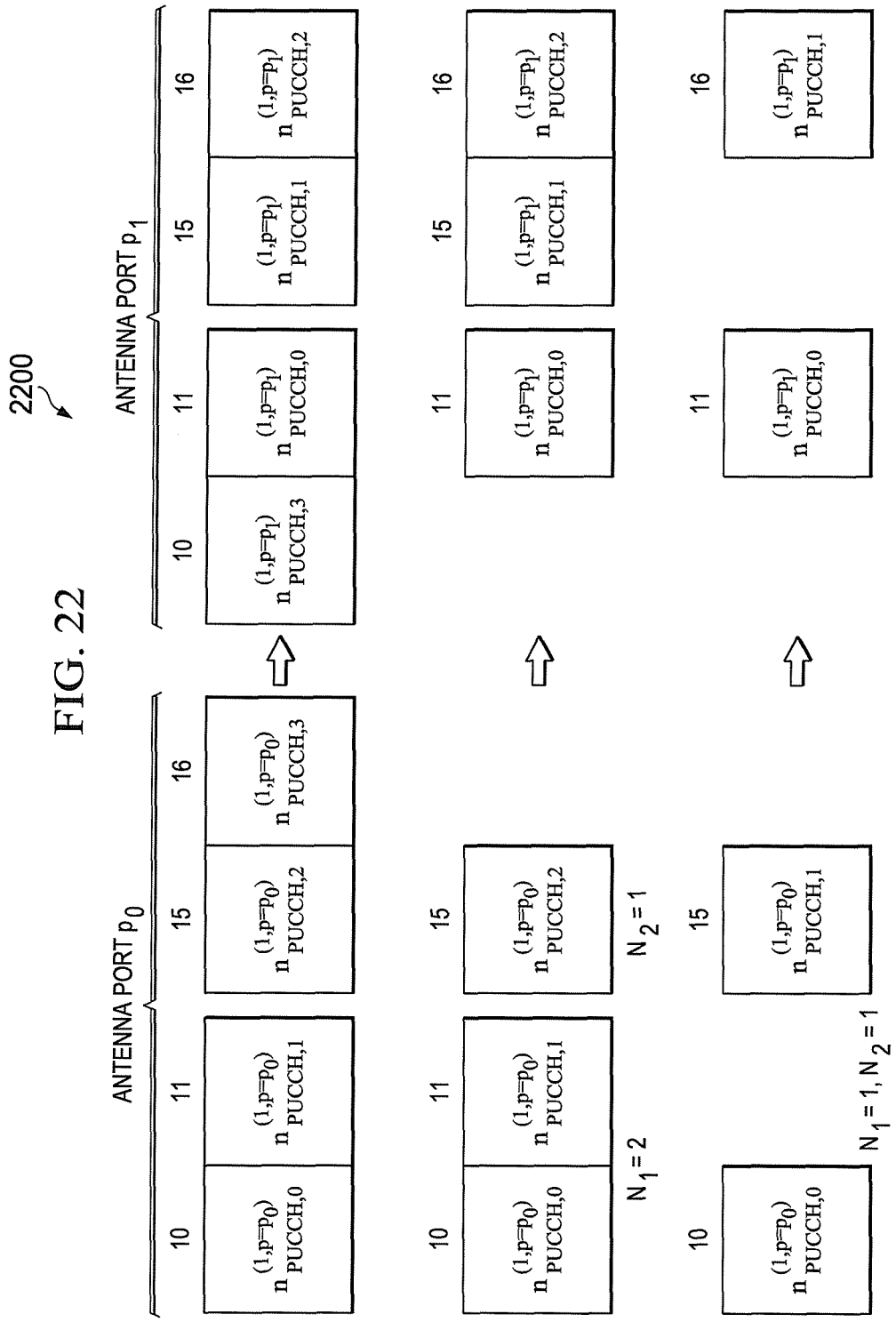
FIG. 22 illustrates a determination of a second set of control channels for antenna port $p_1$ according to a further embodiment of this disclosure.

FIG. 22 illustrates a determination 2200 of a second set of control channels for antenna port $p_1$ according to a further embodiment of this disclosure.

In FIG. 22, $n_{offset}=1$. For example, when uplink control channels 10, 11 and 15 are determined for antenna port $p_0$, then uplink control channels 11, 15 and 16 are determined for antenna port $p_1$. Again in this case, the uplink control channels that the eNodeB has to monitor to decode a HARQ-ACK message are 10, 11, 15, 16. In other words, eNodeB has to assign 4 uplink control channels for the UE.

The embodiment of FIG. 22 assumes a fallback-friendly mapping characterized as follows:

A DL grant dynamically determines two uplink control channels for the first antenna port, or, antenna port $p_0$. For example, a DL grant scheduling a PDSCH on the PCC determines two control channels $n_{PUCCH,0}^{(1,\tilde{p}=p0)}$ and $n_{PUCCH,0}^{(1,\tilde{p}=p0)}$, and a DL grant scheduling a PDSCH on the SCC determines two control channels $n_{PUCCH,2}^{(1,\tilde{p}=p0)}$ and $n_{PUCCH,3}^{(1,\tilde{p}=p0)}$.

Each HARQ-ACK message associated with a single DL grant reception (e.g., (ACK,ACK,DTX/NACK,DTX/NACK)) is mapped to a QPSK symbol on the first control channel on the first antenna port, e.g., $n_{PUCCH,0}^{(1,\tilde{p}=p0)}$. For example, a HARQ-ACK state (ACK,ACK,DTX/NACK, DTX/NACK) is mapped onto a transmission of a QPSK symbol $q_0$ on $n_{PUCCH,0}^{(1,\tilde{p}=p0)}$.

Each HARQ-ACK message associated with both DL grant reception (e.g., (ACK,ACK,ACK,ACK)) is mapped to a QPSK symbol on the second control channel on the first antenna port, e.g., $n_{PUCCH,1}^{(1,\tilde{p}=p_0)}$.

Under the set of assumptions listed above, this embodiment ensures that the UE can find a control channel to be used by the second antenna port, even when the eNodeB transmits two DL grants but the UE misses one out of the two. This can be seen in the following:

A channel to convey a HARQ-ACK message associated with a single DL grant reception scheduling PDSCH on the PCC on the second antenna is equal to $n_{PUCCH,1}^{(1,\tilde{p}=p_0)}$. Even if the UE misses a DL grant scheduling PDSCH on the SCC, the UE can still transmit a corresponding HARQ-ACK message on the second antenna port.

A channel to convey a HARQ-ACK message associated with a single DL grant reception scheduling PDSCH on the SCC on the second antenna is equal to $n_{PUCCH,3}^{(1,\tilde{p}=p_0)}$. Even if the UE misses the DL grant scheduling PDSCH on the PCC, the UE can still transmit a corresponding HARQ-ACK message on the second antenna port.

In some embodiments of this disclosure, when the C number of configured component carriers (or cells) is greater than 2, then the UE uses spatial bundling (logical AND operation to construct one bit out of up to two bits) to reduce the total number of HARQ-ACK bits, to be reduced to be C, and use Rel-8 channel selection mapping (i.e., table 1100, table 1200 and table 1300) with M=C. On the other hand, when the C number of configured component carriers is 2, then the UE transmits A=$N_1$+$N_2$ number of HARQ-ACK bits (where $N_1$ and $N_2$ are the numbers of TBs in the PCC and the SCC, respectively) and uses another channel selection mapping optimized for two-cell DL transmission.

As two-cell aggregation is expected to be the most frequently configured in practice, it would be better to optimize the HARQ-ACK transmission for the two-cell aggregation so that a UE can report a variable number of HARQ-ACK bits, depending on the configured transmission modes in the two cells. However, a set of channel selection tables optimized for two-cell aggregation does not ensure a good tradeoff between performance and UE complexity. Hence, a simpler channel selection rule, e.g., Rel-8 channel selection mapping with spatial bundling, is applied when the number of configured component carriers is greater than 2.

FIGS. 23A and 23B illustrate data transmission over two antennas using slot-based precoding vector switching (PVS) or time switched transmit diversity (TSTD) according to an embodiment of this disclosure.

As shown in FIGS. 23A and 23B, in some cases, a UE utilizes a specification-transparent transmit diversity scheme to transmit a dynamic ACK/NACK modulation symbol in a single PUCCH resource which is mapped by the one control channel element (CCE). One of ordinary skill in the art would recognize that when specification-transparent uplink transmit diversity scheme is used, the eNodeB receiver assumes that the UE does not transmit signals using transmit diversity. Therefore, the eNodeB receiver treats the signals received from the UE as coming from a single uplink transmit antenna port. The ACK/NACK modulation symbol is multiplexed with the same CS and OC mapping to one CCE, and then the data are transmitted over two antennas using slot-based precoding vector switching (PVS) or time switched transmit diversity (TSTD), which preserves single-carrier (SC) property and employs one orthogonal resource for DMRS and control data.

When carrier aggregation is implemented, a UE may receive data signals (or PDSCHs) from a number of DL component carriers (CCs). In order for an eNodeB to inform a UE of a downlink resource assignment in a subframe, the eNodeB sends the UE at least one downlink transmission grant.

Implementations of carrier aggregation, which could be either symmetric or asymmetric carrier aggregation, are considered in this disclosure. In a subframe, an eNodeB assigns a number of DL CCs, say N DL CCs, to a UE, through which the eNodeB transmits data signals to the UE. In some embodiments, the eNodeB sends N DL grants to the UE in the N DL CCs, one DL grant in each of these DL CCs. In other embodiments, the eNodeB sends N DL grants to the UE in only one DL CC, where these DL grants may have a carrier-indicator field, which indicate a CC that a DL grant schedules a PDSCH in. It is noted that a DL grant can be alternatively be referred to as a PDCCH (physical downlink control channel), PDCCH grant, or a downlink control information (DCI) assignment.

Furthermore, a DL anchor CC and an UL anchor CC can be configured in a UE-specific way or in a cell-specific way. The DL anchor CC for a UE is a DL CC that carries a DL grant for the UE in all the subframes in which the UE receives data signals. In other words, when the UE receives at least one DL grant in a subframe, the DL anchor CC will carry a DL grant for the UE. The one UL anchor CC for a UE is an UL CC that carries uplink control information for a UE, such as dynamic ACK/NACKs that corresponds to DL data transmissions in the N DL CCs in earlier subframes.

In embodiments of this disclosure, a UE's method of transmitting acknowledgement signals depends on the number of DL CCs that have carried PDCCH DL grants in a corresponding DL subframe.

In a particular embodiment, acknowledgement signals are transmitted as follows:

When only one DL CC (i.e., a DL anchor) carries a DL grant for a UE, the UE transmits a corresponding ACK/NACK bits using the LTE Rel-8 method of ACK/NACK transmission in FDD.

In particular, when the UE has more than one Tx antenna, the UE uses a specification-transparent transmit diversity scheme to transmit an ACK/NACK modulation symbol in a PUCCH D-ACK resource.

When more than one DL CCs carry a DL grant for a UE, the UE transmits corresponding ACK/NACK bits using ACK/NACK multiplexing method by a channel selection method.

Figure 24:
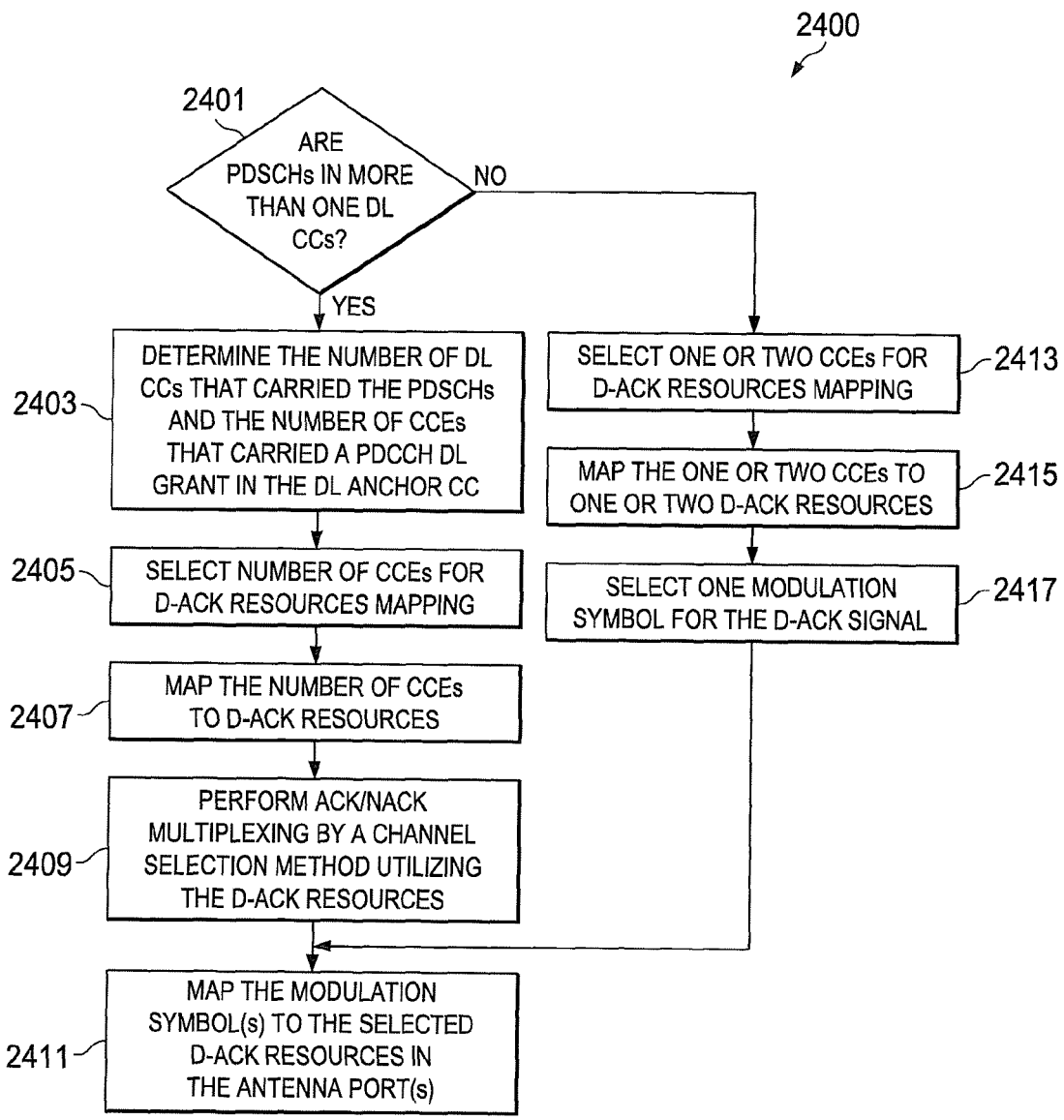
FIG. 24 illustrates a method of ACK/NACK transmission at a UE when ACK/NACK multiplexing is utilized according to an embodiment of this disclosure.

FIG. 24 illustrates a method 2400 of ACK/NACK transmission at a UE when ACK/NACK multiplexing is utilized according to an embodiment of this disclosure.

As shown in FIG. 24, method 2400 includes determining whether more than one DL CC carry the PDSCHs (block 2401).

If the PDSCHs are transmitted in more than one DL CC, the N number of DL CCs that carried the PDSCHs and the M number of CCEs that carried a PDCCH DL grant in the DL anchor CC are determined (block 2403). N number of CCEs for D-ACK resources mapping are selected (block 2405). The N number of CCEs are mapped to N D-ACK resources (block 2407). ACK/NACK multiplexing is performed by a channel selection method utilizing the N D-ACK resources (block 2409). The modulation symbols are then mapped to the selected D-ACK resources in the antenna ports (block 2411).

If the PDSCHs are transmitted in one DL CC, one or two CCEs for D-ACK resources mapping are selected (block 2413). The one or two CCEs are mapped to one or two D-ACK resources (block 2415). One modulation symbol is selected for the D-ACK signal (block 2417). The modulation symbol is then mapped to the one or two D-ACK resources in the antenna port (block 2411).

In other embodiments, acknowledgement signals are transmitted as follows:

When only one DL CC (i.e., a DL anchor) carries a DL grant for a UE, the UE transmits corresponding ACK/NACK bits using the LTE Rel-8 method of ACK/NACK transmission in FDD.

In particular, when the UE has more than one Tx antenna, the UE uses a specification-transparent transmit diversity scheme to transmit an ACK/NACK modulation symbol in a PUCCH D-ACK resource.

When more than one DL CCs carry a DL grant for a UE, the UE transmits corresponding ACK/NACK bits using an ACK/NACK bundling method.

Figure 25:
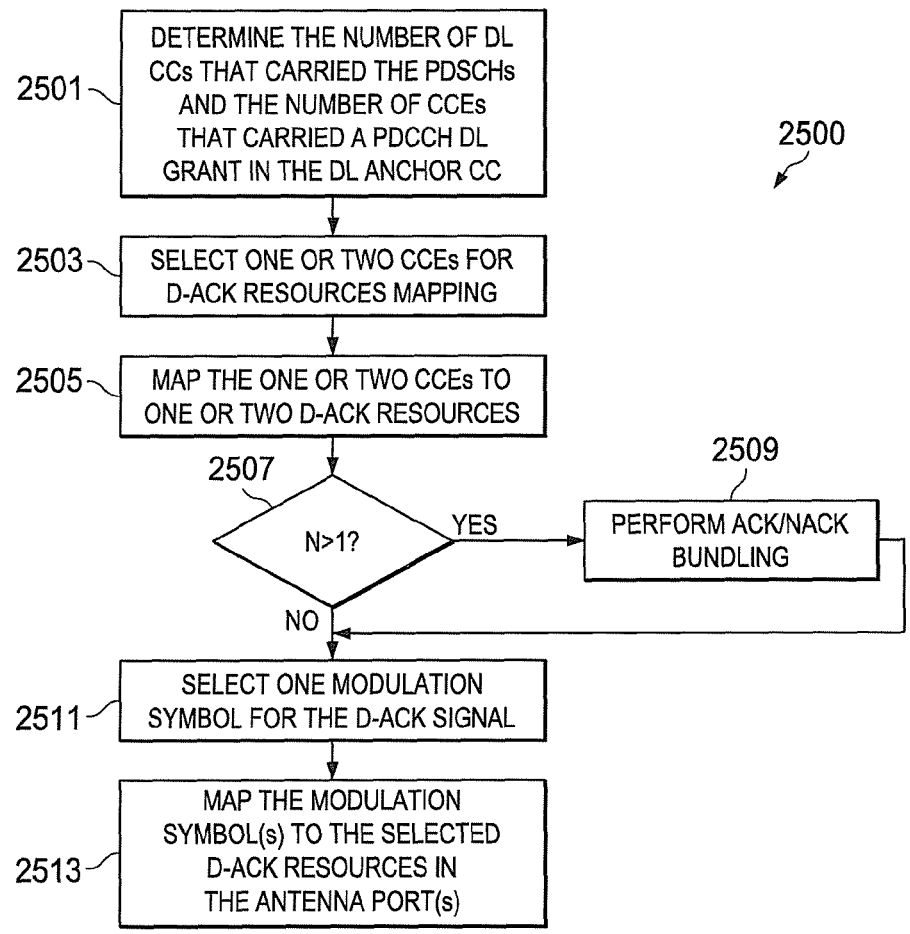
FIG. 25 illustrates a method of ACK/NACK transmission at a UE when ACK/NACK bundling is utilized according to an embodiment of this disclosure.

FIG. 25 illustrates a method 2500 of ACK/NACK transmission at a UE when ACK/NACK bundling is utilized according to an embodiment of this disclosure.

As shown in FIG. 25, method 2500 includes determining the N number of DL CCs that carried the PDSCHs and the M number of CCEs that carried a PDCCH DL grant in the DL anchor CC (block 2501). One or two CCEs for D-ACK resources mapping are selected (block 2503). The one or two CCEs are mapped to one or two D-ACK resources (block 2505). If N>1 (block 2507), ACK/NACK bundling is performed (block 2509). One modulation symbol is selected for the D-ACK signal (block 2511). The modulation symbol is then mapped to the one or two D-ACK resources in the antenna port (block 2513).

In some embodiments of this disclosure, UL control resources for a UE's dynamic ACK/NACKs which acknowledge on a corresponding DL data transmission in N DL CCs are located in an UL anchor CC for the UE. Furthermore, the UL control resources are determined by CCEs that carry a DL grant in a DL anchor CC for the previous DL data transmission for the UE. The size of the UL control resources is the same as the number of DL CCs that have been used in the previous DL data transmission, or N.

Figure 26:
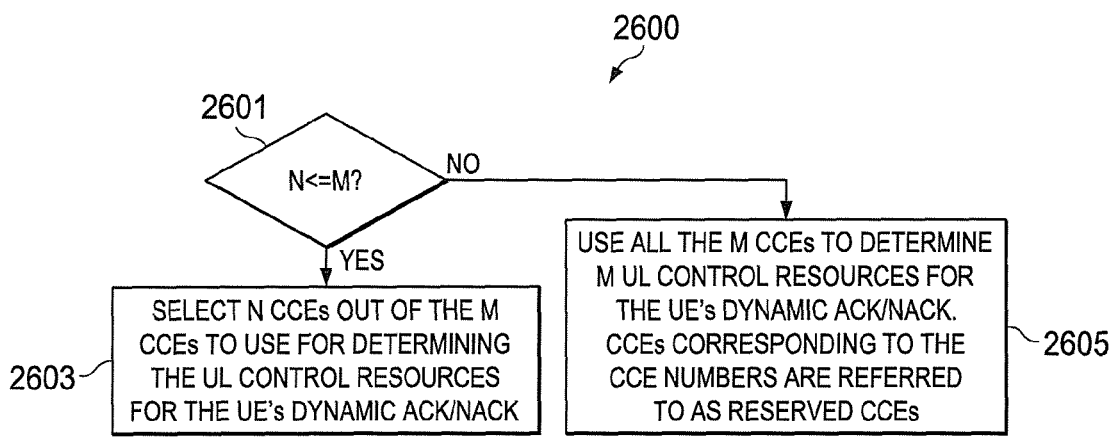
FIG. 26 illustrates a method of selecting N CCEs for D-ACK resource mapping according to an embodiment of this disclosure.

FIG. 26 illustrates a method 2600 of selecting N CCEs for D-ACK resource mapping according to an embodiment of this disclosure.

Some embodiments of this disclosure describe the selection of N CCEs for D-ACK resource mapping, for example, the selection of the N number of CCEs for D-ACK resources mapping at block 2405 of FIG. 24.

As shown in FIG. 26, the selection of N CCEs for D-ACK resource mapping includes determining whether N≤M (block 2601). Depending on the M number of CCEs that carry the DL grant in the DL anchor CC and the N number of PDSCHs, two different methods are utilized for the selection of the N CCEs for D-ACK resource mapping as illustrated in FIG. 26.

In some cases, the M number CCEs that carry the DL grant in the DL anchor CC is larger than or equal to the number of DL CCs used in the previous DL data transmission, or N. In these cases, N CCEs out of the M CCEs are used for determining the UL control resources for the UE's dynamic ACK/NACK (block 2603). In one example, the N CCEs having the N smallest CCE index numbers out of the M CCEs are used. In another example, the N CCEs having the N largest CCE index numbers from the M CCEs are used.

In some embodiments, the M number of CCEs that carry the DL grant in the DL anchor CC is smaller than the number of DL CCs used in the previous DL data transmission, or N. In this case, all the M CCEs are used for determining M UL control resources for the UE's dynamic ACK/NACK. The remaining (N−M) UL control resources are determined by (N−M) CCE numbers from the remaining CCE numbers other than the M CCE numbers. There can be multiple methods of choosing the (N−M) CCE numbers. CCEs corresponding to the (N−M) CCE numbers are referred to as reserved CCEs (block 2605).

In some embodiments, the (N-M) CCE numbers are (N-M) consecutive numbers starting from a number which is larger than the largest CCE number among the M CCE numbers by 1. For example, when N=4, M=2 and the M CCEs are CCEs 3 and 4, the (N−M) CCE numbers used for determining the remaining UL control resources are 5 and 6.

In another method, the (N−M) CCE numbers are (N−M) consecutive numbers chosen from CCE numbers of CCEs sharing a same parent node in a CCE search space tree as the M aggregated CCEs carrying the PDCCH or DL grant. One way of choosing the (N−M) CCE numbers in this embodiment is to choose the largest-numbered CCEs from those CCEs sharing the same parent node as the M aggregated CCEs carrying the DL grant.

Figure 27:
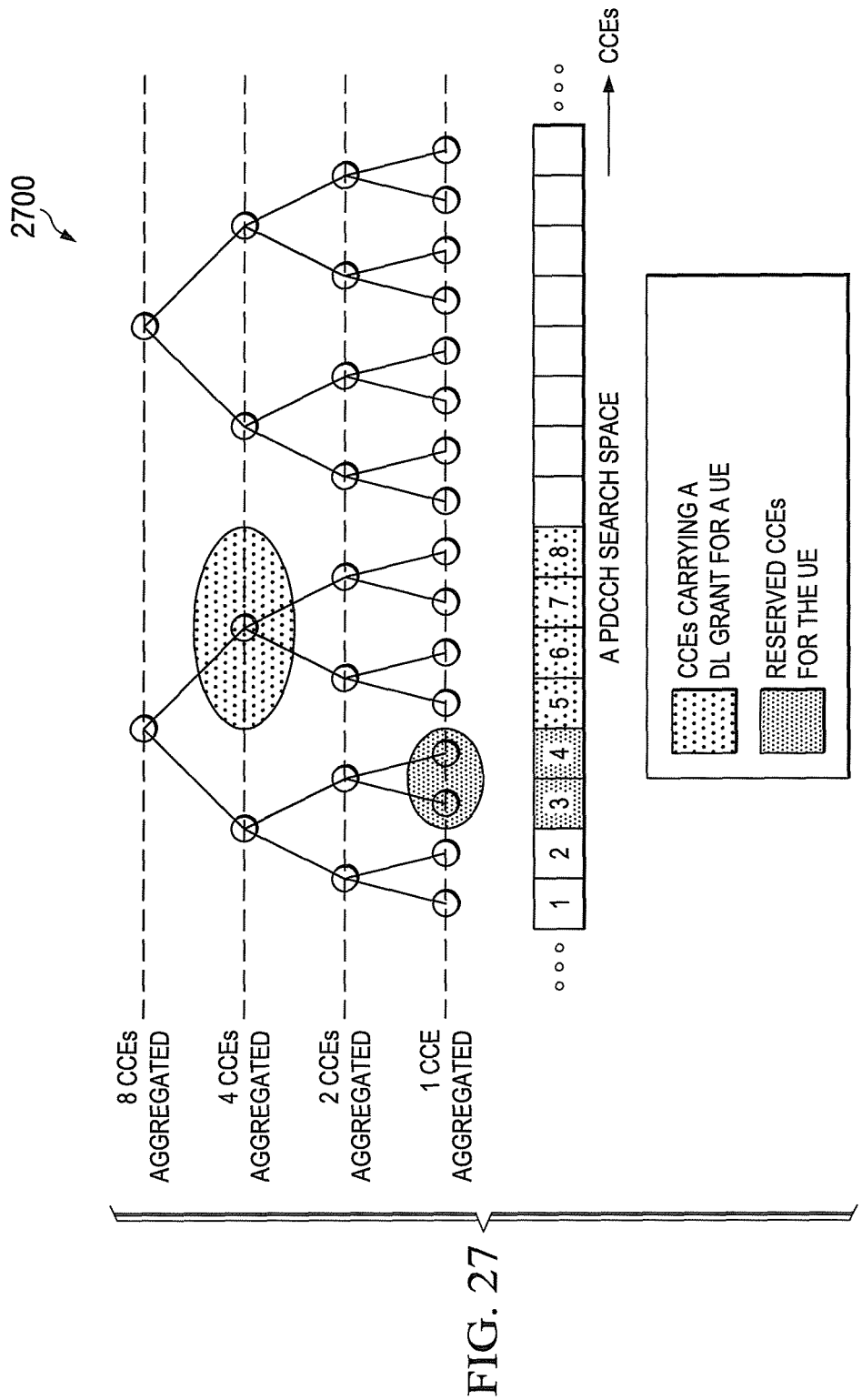
FIG. 27 illustrates a method of CCE resource reservation for ACK/NACK transmissions according to an embodiment of this disclosure.

FIG. 27 illustrates a method 2700 of CCE resource reservation for ACK/NACK transmissions according to an embodiment of this disclosure.

As shown in FIG. 27, in a DL anchor, (M=4) CCEs, i.e., CCEs 5 through 8, carry a DL, grant for a UE in a subframe. If the total number of DL grants for the UE in the subframe is N=6, then (N−M=1) CCEs need to be reserved for ACK/NACK mapping. CCEs sharing a same parent node as CCEs 5 through 8 are CCEs 1 through 4, and the largest two CCE numbers from 1 through 4 are 3 and 4. Hence, CCEs 3 and 4 are reserved for the UE's ACK/NACK transmissions. In another embodiment, the smallest-numbered CCEs from those CCEs sharing the same parent node are chosen as the M aggregated CCEs carrying the DL grant.

In some embodiments, only one set of dynamic ACK/NACK resources is allocated in an UL CC, implying that the UEs will receive one offset index $N_{PUCCH}^{(l)}$ for a mapping rule of CCE numbers to ACK/NACK resources. The offset index $N_{PUCCH}^{(l)}$ is configured by higher layers according to the Rel-8 LTE specifications.

Some embodiments of this disclosure describe mapping of N CCE numbers to D-ACK resources, for example in block 2407 of FIG. 24.

In some embodiments, the mapping the N CCE indices to N UL ACK/NACK resources is described as follows:

for a dynamically scheduled physical downlink shared channel (PDSCH) indicated by the detection of a corresponding PDCCH in subframe n−4, N PUCCH ACK/NACK resources are assigned to a UE. Each of the N index numbers for the PUCCH ACK/NACK resources are determined by Equation 5 below:

$$n_{PUCCH,k}^{(1)} = n_{CCE,k} + N_{PUCCH}^{(l)}, k=1, 2, \ldots, N,  \quad [\text{Eqn. 5}]$$

where $n_{CCE,k}$ is the k-th index number of a CCE out of the N CCEs selected from the M CCEs used for transmission of the corresponding DCI assignment and max {N−M,0} reserved CCEs.

Figure 28:
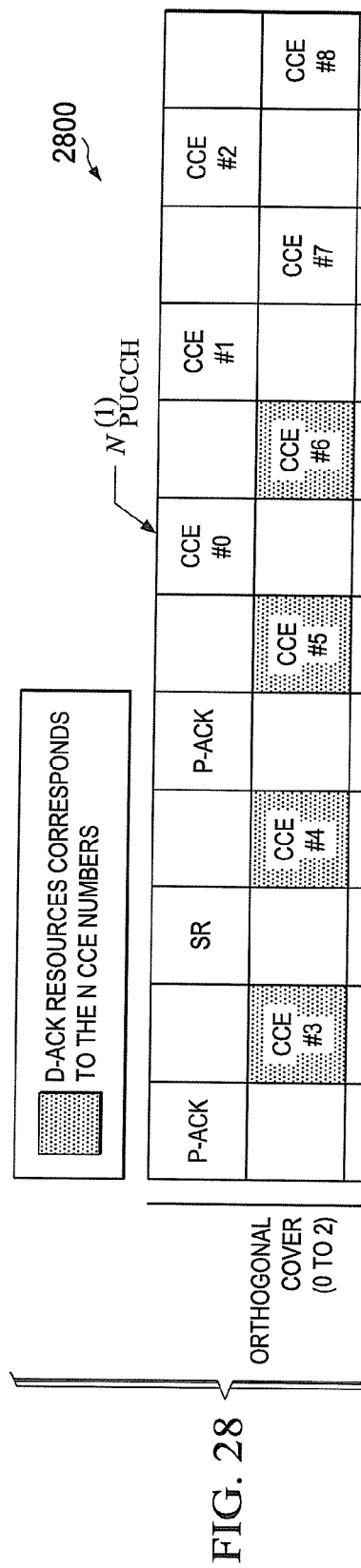
FIG. 28 illustrates CCE to ACK/NACK mapping when only one $N_{PUCCH}^{(I)}$ index number is signaled according to an embodiment of this disclosure.

FIG. 28 illustrates CCE to ACK/NACK mapping 2800 when only one $N_{PUCCH}^{(l)}$ index number is signaled according to an embodiment of this disclosure.

For example, as shown in FIG. 28, when CCEs 3, 4, 5 and 6 are the N=4 CCEs that will be used for ACK/NACK resource mapping for a UE, the resultant PUCCH dynamic ACK/NACK resources will be determined as illustrated in FIG. 28, where $\Delta_{shift}^{PUCCH}=2$.

If there are any reserved CCEs for a UE, the usage of the reserved CCEs is restricted at the eNodeB. The reserved CCEs cannot be used for DL grant for another UE, as doing so may result in dynamic ACK/NACK resource collision. However, the reserved CCEs can be used for other purposes, for example, UL grant, common control, and so on.

In some embodiments, two sets of dynamic ACK/NACK resources are allocated in an UL CC, implying that the UEs will receive two offset indices $N_{PUCCH,1}^{(l)}$ and $N_{PUCCH,2}^{(l)}$ for a mapping rule of CCE numbers to ACK/NACK resources. One offset index $N_{PUCCH,1}^{(l)}$ is equal to a $N_{PUCCH}^{(l)}$ which is configured by higher layers according to the Rel-8 LTE specifications. The other offset index $N_{PUCCH,2}^{(l)}$ is configured by higher layers for advanced users (e.g., Rel-10 LTE-A UEs). Among N PUCCH ACK/NACK resources, one group of resources are determined by $N_{PUCCH,1}^{(l)}$ and a corresponding number of CCE index numbers among the N CCE numbers. The other groups of resources are determined by $N_{PUCCH,2}^{(l)}$ and a corresponding number of CCE index numbers.

This disclosure also describes other embodiments of mapping of N CCE numbers to D-ACK resources, for example in block 2407 of FIG. 24.

One embodiment of mapping the N CCE indices to N UL ACK/NACK resources is described as follows:

For a dynamically scheduled physical downlink shared channel (PDSCH) indicated by the detection of a corresponding PDCCH in subframe n−4, N PUCCH ACK/NACK resources are assigned to a UE. One index number for the PUCCH ACK/NACK resource is determined by Equation 6 below:

$$n_{PUCCH,1}^{(1)} = n_{CCE,1} + N_{PUCCH}^{(l)}. \quad [\text{Eqn. 6}]$$

Each of the remaining (N−1) index numbers for the PUCCH ACK/NACK resources are determined by Equation 7 below:

$$n_{PUCCH,k}^{(1)} = n_{CCE,1} + N_{PUCCH,2}^{(l)}, k=2, 3, \ldots, N \quad [\text{Eqn. 7}]$$

where $n_{CCE,k}$ is the k-th index number of a CCE out of the N CCEs selected from the M CCEs used for transmission of the corresponding DCI assignment and max {N−M,0} reserved CCEs.

Figure 29:
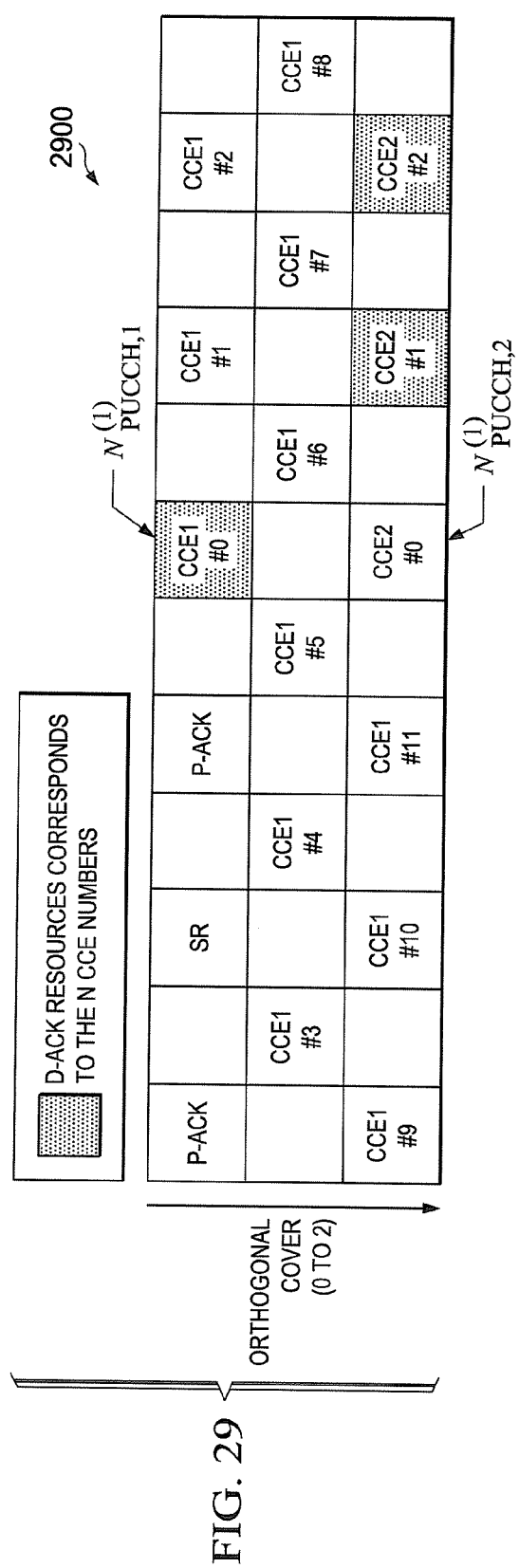
FIG. 29 illustrates CCE to ACK/NACK mapping when two $N_{PUCCH}^{(I)}$ index numbers are signaled according to an embodiment of this disclosure.

FIG. 29 illustrates CCE to ACK/NACK mapping 2900 when two $N_{PUCCH}^{(l)}$ index numbers are signaled according to an embodiment of this disclosure.

For example, when CCEs 0, 1 and 2 are the N=3 CCEs that will be used for ACK/NACK resource mapping for a UE, the resultant PUCCH dynamic ACK/NACK resources will be determined as illustrated in FIG. 29, where $\Delta_{shift}^{PUCCH}=2$.

If there are any reserved CCEs for a UE, the usage of the reserved CCEs is restricted at the eNodeB. The reserved CCEs cannot be used for DL grant for another advanced UE (e.g., Rel-10 UE), as doing so may result in dynamic ACK/NACK resource collision. However, the reserved CCEs can be used for other purposes, for example, DL grant for Rel-8 LTE UE, UL grant, common control, and so on.

In some embodiments of this disclosure, for both cases with one offset and with two offsets for dynamic ACK/NACK resources, $n_{CCE,k}$, or the k-th index number from the N CCE numbers, k=1, 2, . . . , N, is described in one of the at least two ways listed below.

In one embodiment, $n_{CCE,k}$ is the k-th smallest CCE number out of the N CCE numbers.

In another embodiment, the first M PUCCH ACK/NACK resources are determined by the M CCEs used for transmission of the corresponding DCI assignment, and the rest (N−M) resources are determined by the max {N−M,0} reserved CCEs. One example of this embodiment is described as follows: when k≤M, $n_{CCE,k}$ is the k-th smallest CCE number from the M CCEs used for transmission of the corresponding DCI assignment; on the other hand, when k>M, $n_{CCE,k}$ is the (k−M)-th smallest CCE number from the (N-M) reserved CCEs.

Figure 30:
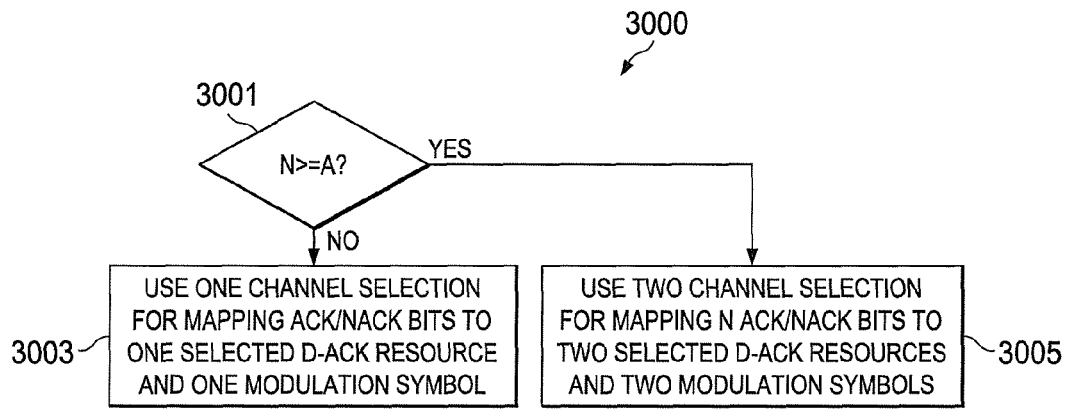
FIG. 30 illustrates a method of ACK/NACK multiplexing according to an embodiment of this disclosure.

FIG. 30 illustrates a method 3000 of ACK/NACK multiplexing according to an embodiment of this disclosure.

In some embodiments of this disclosure, a number of channels (or D-ACK resources) and a number of modulation symbols used for ACK/NACK multiplexing varies depending upon a number of corresponding PDSCHs in DL CCs. Method 3000 includes determining whether the number of N PDSCHs is greater than or equal to a constant number A (block 3001). When the number of N PDSCHs is smaller than the constant number A, one channel selection is used for mapping N ACK/NACK bits to one selected D-ACK resource and one modulation symbol (block 3003). On the other hand, when the number of N PDSCHs is greater than or equal to A, two channel selection is used for mapping N ACK/NACK bits to two selected D-ACK resources and two modulation symbols (block 3005).

Figure 31:
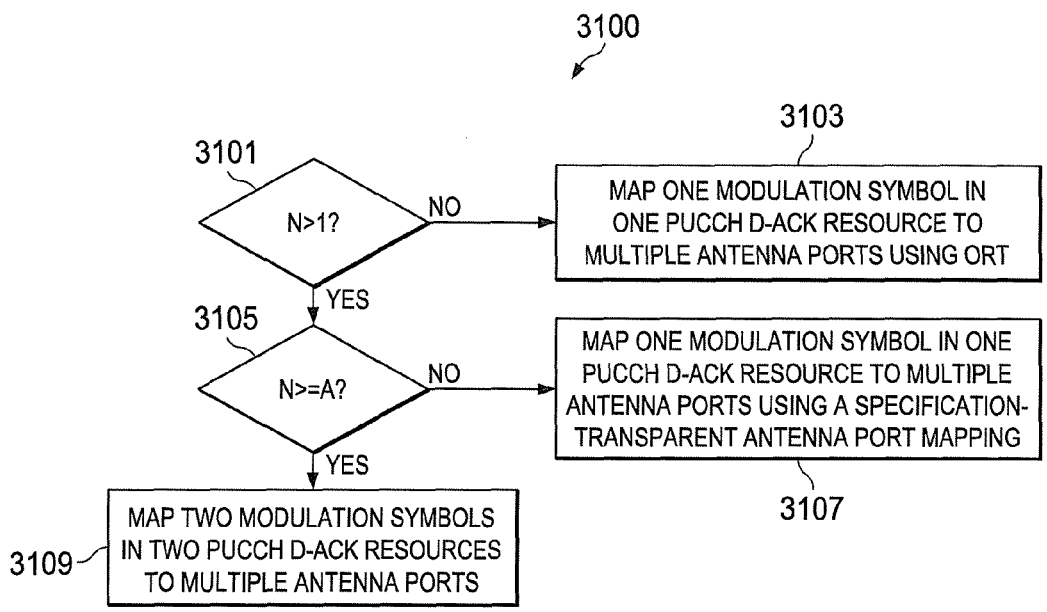
FIG. 31 illustrates a method of a mapping of modulation symbol(s) to selected D-ACK resource(s) in antenna port(s) according to an embodiment of this disclosure.

FIG. 31 illustrates a method 3100 of a mapping of modulation symbol(s) to selected D-ACK resource(s) in antenna port(s) according to an embodiment of this disclosure.

Furthermore, when a UE is configured to perform ORT, the modulation symbols are to be mapped to antenna ports as illustrated in FIG. 31. Method 3100 includes determining whether N>1 (block 3101). When N=1, the UE maps one modulation symbol in one PUCCH D-ACK resource to multiple antenna ports using ORT (block 3103). When N>1, method 3100 includes determining whether N≥A (block 3105). If N<A, then the UE maps one modulation symbol in one PUCCH D-ACK resource to multiple antenna ports using a specification-transparent antenna port mapping (block 3107). If N≥A, the UE maps two modulation symbols in two PUCCH D-ACK resources to multiple antenna ports (block 3109).

Figure 32:
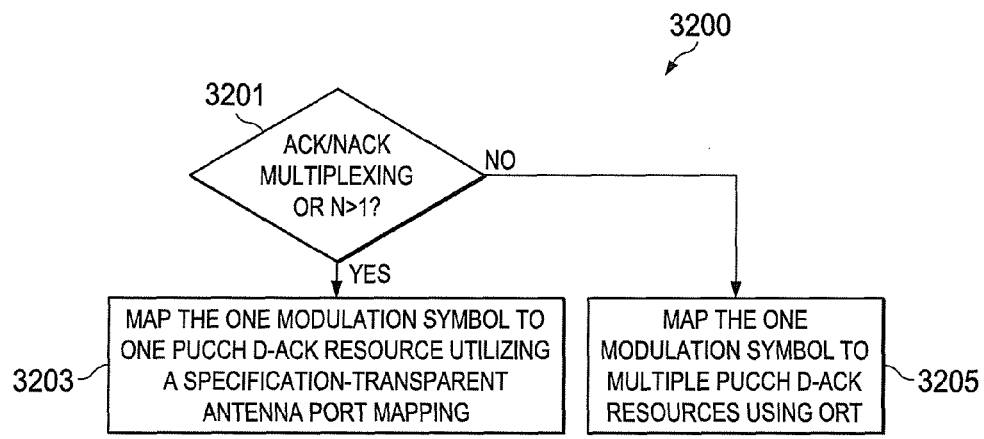
FIG. 32 illustrates a method of a mapping of modulation symbol(s) to selected D-ACK resource(s) in antenna port(s) according to another embodiment of this disclosure.

FIG. 32 illustrates a method 3200 of a mapping of modulation symbol(s) to selected D-ACK resource(s) in antenna port(s) according to another embodiment of this disclosure.

In embodiments of this disclosure, it is assumed that one (n=1) channel selection method is utilized and the UE is configured to perform ORT. In this case, a modulation symbol mapping method varies depending upon a number of corresponding PDSCHs in DL CCs. Method 3200 includes determining whether the number of PDSCHs, N, is more than one or whether ACK/NACK multiplexing is utilized (block 3201). When the number of PDSCHs is more than one (or when ACK/NACK multiplexing is utilized), the one modulation symbol is mapped to one PUCCH D-ACK resource utilizing a specification-transparent antenna port mapping (block 3203). When the number of PDSCHs is precisely one, the one modulation symbol is mapped to multiple PUCCH D-ACK resources using ORT (block 3205). In some embodiments, N is the number of configured DL CCs.

Figure 33:
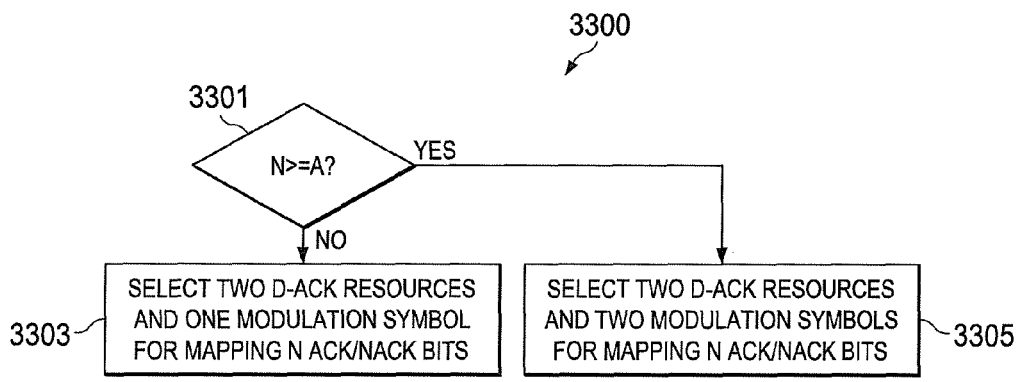
FIG. 33 illustrates a method of ACK/NACK multiplexing according to another embodiment of this disclosure.

FIG. 33 illustrates a method 3300 of ACK/NACK multiplexing according to another embodiment of this disclosure.

In some embodiments of this disclosure, a number of N modulation symbols used for ACK/NACK multiplexing varies depending upon a number of corresponding PDSCHs in DL CCs. Method 3300 includes determining whether the number of N PDSCHs is greater than or equal to a constant number A (block 3301). When the number of N PDSCHs is smaller than the constant number A, two D-ACK resources and one modulation symbol are selected for mapping N ACK/NACK bits (block 3303). On the other hand, when the number of PDSCHs is greater than or equal to the constant number A, two D-ACK resources and two modulation symbols are selected for mapping N ACK/NACK bits (block 3305).

Figure 34:
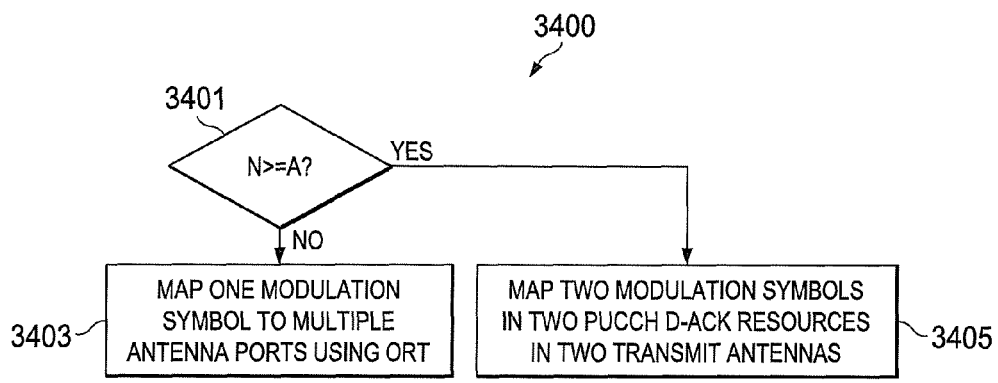
FIG. 34 illustrates a method of a mapping of modulation symbol(s) to selected D-ACK resource(s) in antenna port(s) according to a further embodiment of this disclosure.

FIG. 34 illustrates a method 3400 of a mapping modulation symbol(s) to selected D-ACK resource(s) in antenna port(s) according to a further embodiment of this disclosure.

When a UE is configured to perform ORT, the modulation symbols are to be mapped to antenna ports as illustrated in FIG. 34. Method 3400 includes determining whether the number of N PDSCHs is greater than or equal to a constant number A (block 3401). In particular, when N<A, the UE maps one modulation symbol to multiple antenna ports using ORT (block 3403). When N≥A, the UE maps two modulation symbols in two PUCCH D-ACK resources in two transmit antennas (block 3405).

In embodiments of this disclosure, at least a DL anchor CC carries a DL grant having codepoints indicating the total number of DL grants transmitted in non-anchor DL CCs for a UE in a subframe. As the DL anchor CC carries a DL grant for a UE when there is at least one DL grant for the UE, one state for the signaling of the total number of DL grants in a subframe can be saved.

Particular embodiments relate to cases in which only a DL anchor CC carries those codepoints. In non-anchor CCs, when an eNodeB decides to transmit data to a UE using a DL transmission scheme, say DL transmission scheme X, the eNodeB transmits a DL grant of a DCI format, say DCI format Y, to the UE in a subframe. On the other hand, in the anchor CC for the UE, when the eNodeB decides to transmit data to the UE using DL transmission scheme X, the eNodeB transmits a DL grant of a DCI format slightly different from DCI format Y to the UE in the subframe, in a sense that the DCI format used in the DL anchor CC has codepoints used for indicating the total number of DL grants transmitted in non-anchor CC in the same subframe.

The codepoints in a DL grant in the anchor CC that indicate the total number of DL grants transmitted in non-anchor DL CCs can be provided by an additional field in DCI format Y. In some cases, the additional field could be identical to the carrier indicator field. The number of bits assigned to the additional field is a cell-specific constant, e.g., 2 or 3 bits, or a UE-specific number that may depend on the number of configured CCs for a UE. For example, when a number of configured DL CCs for a UE is N=3, the number of non-anchor DL CCs is 2, and $\log_2(N-1)=\log_2(3-1)=1$ bit is assigned, where (N-1) is the number of non-anchor DL CCs. Particular examples of DCI format Y include DL grant DCI formats 1, 1A, 2A, 2B, etc., defined in an LTE specification (Rel-8, Rel-9 and Rel-10).

Such embodiments are useful for the detection of discontinuous transmission, also known as DTX. Cases where a DL grant is missed at a UE are referred to as DTX. When DTX occurs as a UE does not know that an eNodeB has transmitted a DL grant, a corresponding ACK/NACK cannot be fed back to the eNodeB. When only one CC is configured in FDD system, a DTX is detected at the eNodeB by detecting ACK/NACK signals from the UE at an associated ACK/NACK resource with the DL grant. However, in case where multiple CCs are configured and ACK/NACK multiplexing based on a channel selection is utilized, DTX may not be successfully detected at the eNodeB if at least one DL grant is missed at the UE. As the total number of DL CCs is signalled, DTX can be detected if at least one DL grant is successfully detected at a UE.

Figure 35:
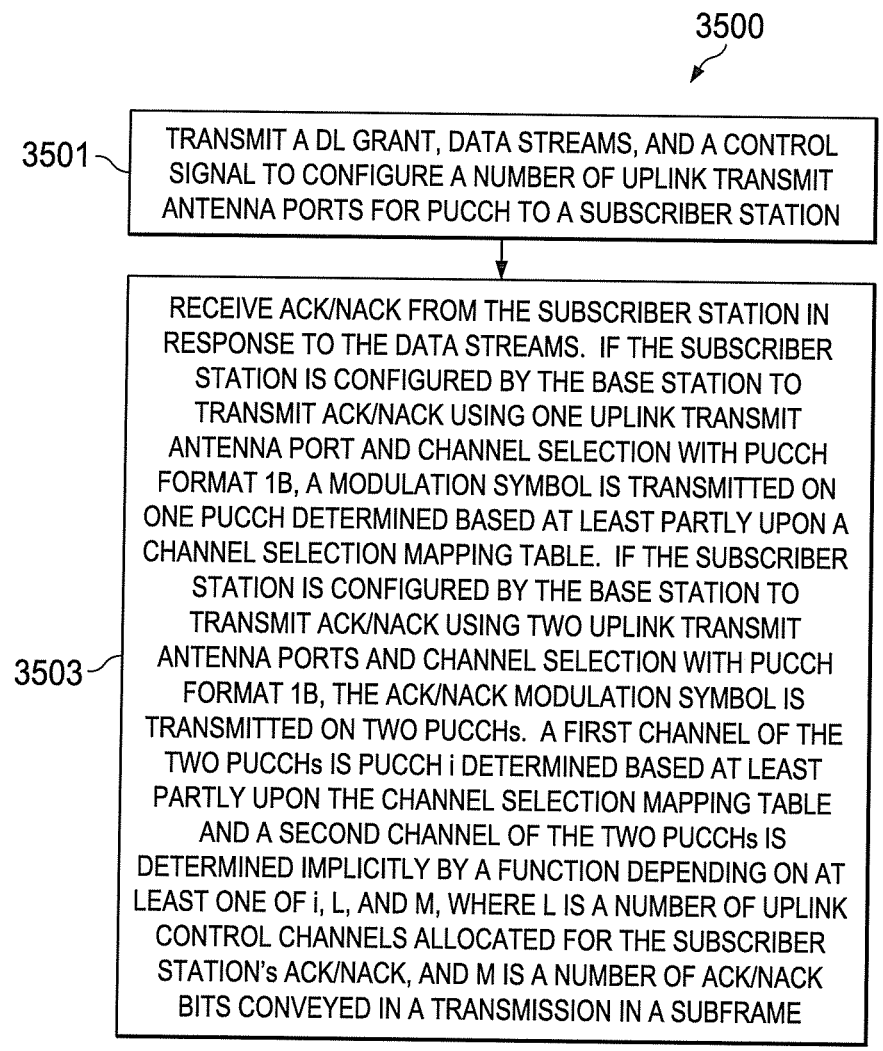
FIG. 35 illustrates a method of operating a base station according to an embodiment of this disclosure.

FIG. 35 illustrates a method 3500 of operating a base station according to an embodiment of this disclosure.

As show in FIG. 35, method 3500 includes transmitting a downlink (DL) grant, data streams, and a control signal to configure a number of uplink transmit antenna ports for physical uplink control channel (PUCCH) to a subscriber station (block 3501). Method 3500 also includes receiving ACKnowledgement/Negative ACKnowledgement (ACK/NACK) from the subscriber station in response to the data streams (block 3503). If the subscriber station is configured by the base station to transmit ACK/NACK using one uplink transmit antenna port and channel selection with PUCCH format 1B, a modulation symbol is transmitted on one physical uplink control channel (PUCCH) i determined based at least partly upon a channel selection mapping table. If the subscriber station is configured by the base station to transmit ACK/NACK using two uplink transmit antenna ports and channel selection with PUCCH format 1B, the ACK/NACK modulation symbol is transmitted on two PUCCHs. A first channel of the two PUCCHs is PUCCH i determined based at least partly upon the channel selection mapping table and a second channel of the two PUCCHs is determined implicitly by a function depending on at least one of i, L, and M, where L is a number of uplink control channels allocated for the subscriber station's ACK/NACK, and M is a number of ACK/NACK bits conveyed in a transmission in a subframe.

Figure 36:
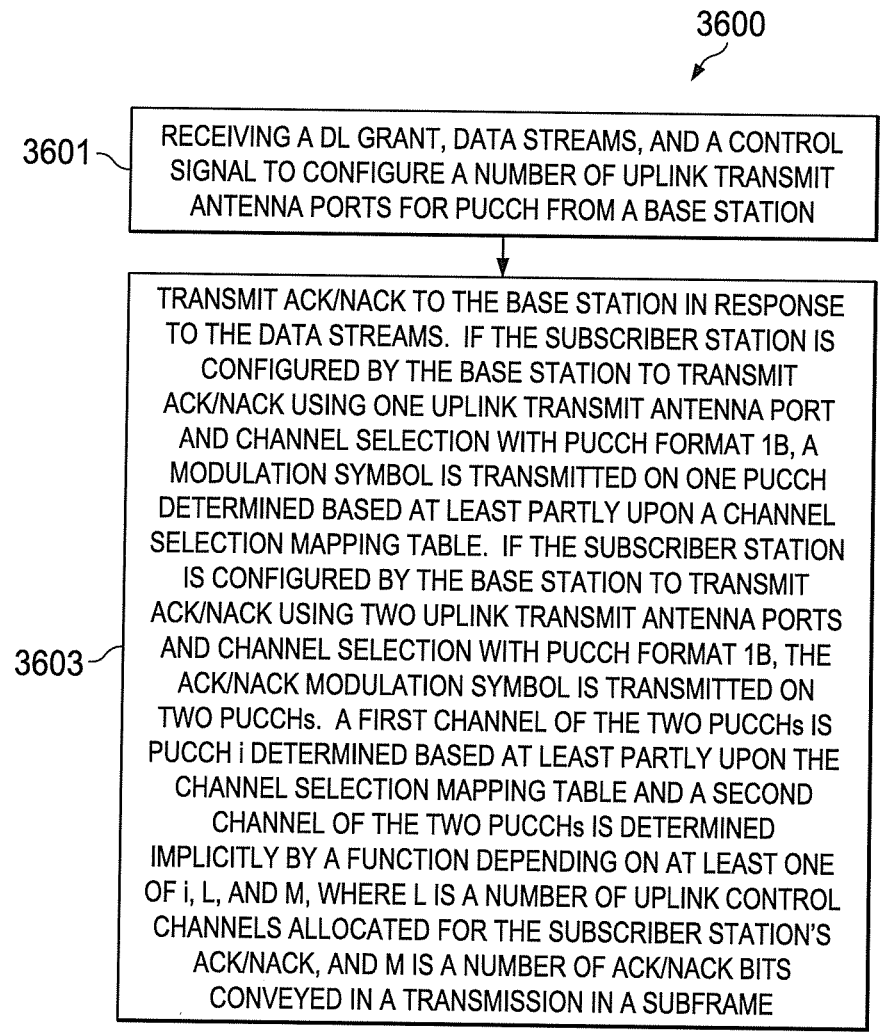
FIG. 36 illustrates a method of operating a subscriber station according to an embodiment of this disclosure.

FIG. 36 illustrates a method 3600 of operating a subscriber station according to an embodiment of this disclosure.

As show in FIG. 36, method 3600 includes receiving a downlink (DL) grant, data streams, and a control signal to configure a number of uplink transmit antenna ports for physical uplink control channel (PUCCH) from a base station (block 3601). The method includes transmitting ACKnowledgement/Negative ACKnowledgement (ACK/NACK) to the base station in response to the data streams (block 3603). If the subscriber station is configured by the base station to transmit ACK/NACK using one uplink transmit antenna port and channel selection with PUCCH format 1B, a modulation symbol is transmitted on one physical uplink control channel (PUCCH) i determined based at least partly upon a channel selection mapping table. If the subscriber station is configured by the base station to transmit ACK/NACK using two uplink transmit antenna ports and channel selection with PUCCH format 1B, the ACK/NACK modulation symbol is transmitted on two PUCCHs. A first channel of the two PUCCHs is PUCCH i determined based at least partly upon the channel selection mapping table and a second channel of the two PUCCHs is determined implicitly by a function depending on at least one of i, L, and M, where L is a number of uplink control channels allocated for the subscriber station's ACK/NACK, and M is a number of ACK/NACK bits conveyed in a transmission in a subframe.

Figure 37:
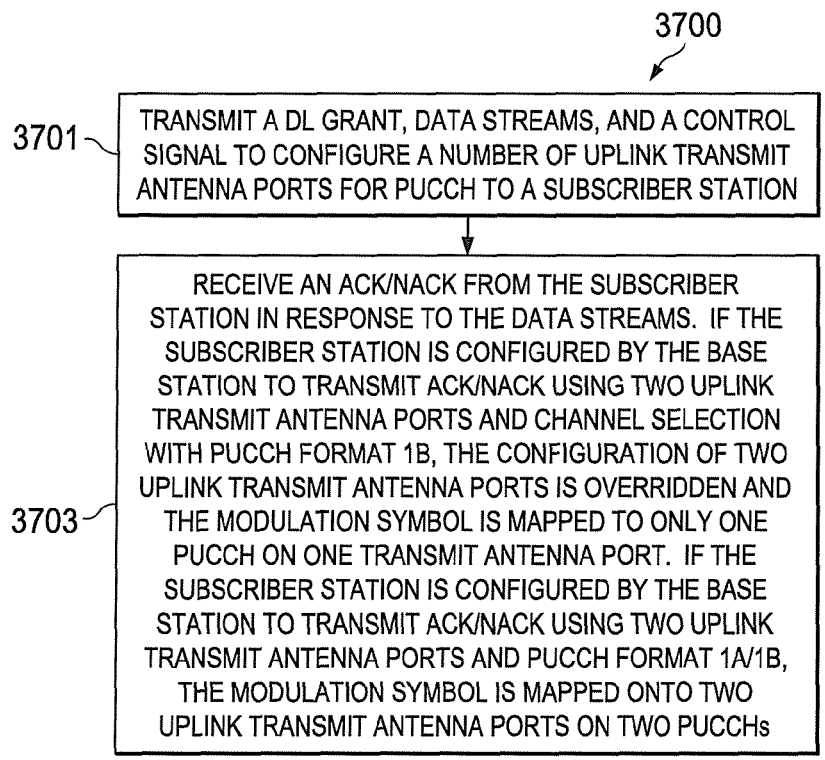
FIG. 37 illustrates a method of operating a base station according to another embodiment of this disclosure.

FIG. 37 illustrates a method 3700 of operating a base station according to another embodiment of this disclosure.

As show in FIG. 37, method 3700 includes transmitting a downlink (DL) grant, data streams, and a control signal to configure a number of uplink transmit antenna ports for physical uplink control channel (PUCCH) to a subscriber station (block 3701). The method also includes receiving an ACKnowledgement/Negative ACKnowledgement (ACK/NACK) from the subscriber station in response to the data streams (block 3703). If the subscriber station is configured by the base station to transmit ACK/NACK using two uplink transmit antenna ports and channel selection with PUCCH format 1B, the configuration of two uplink transmit antenna ports is overridden and the modulation symbol is mapped to only one PUCCH on one transmit antenna port. If the subscriber station is configured by the base station to transmit ACK/NACK using two uplink transmit antenna ports and PUCCH format 1A/1B, the modulation symbol is mapped onto two uplink transmit antenna ports on two PUCCHs.

Figure 38:
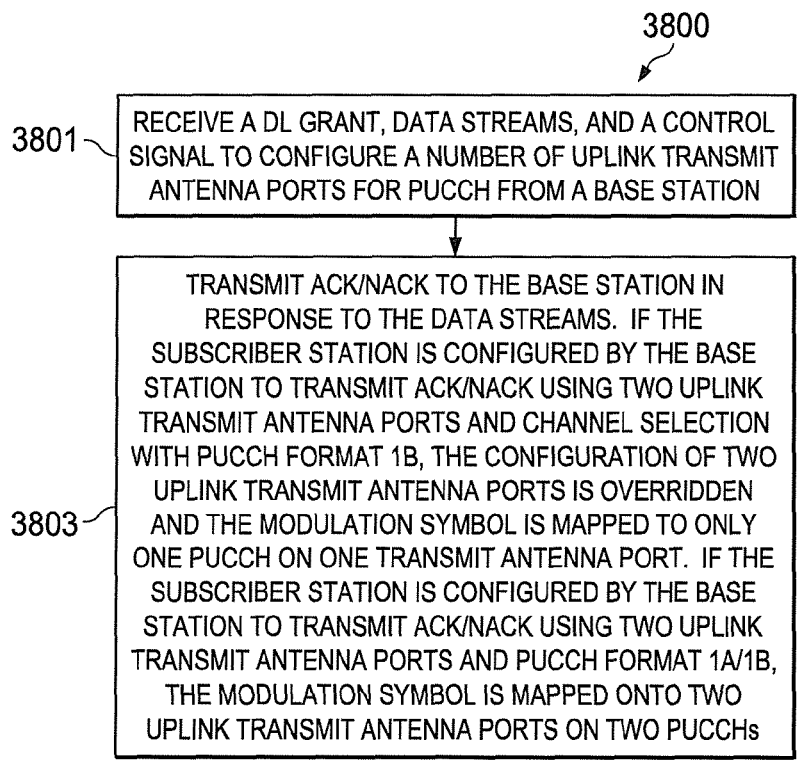
FIG. 38 illustrates a method of operating a subscriber station according to another embodiment of this disclosure.

FIG. 38 illustrates a method 3800 of operating a subscriber station according to another embodiment of this disclosure.

As show in FIG. 38, method 3800 includes receiving a downlink (DL) grant, data streams, and a control signal to configure a number of uplink transmit antenna ports for physical uplink control channel (PUCCH) from a base station (block 3801). The method includes transmitting ACKnowledgement/Negative ACKnowledgement (ACK/NACK) to the base station in response to the data streams (block 3803). If the subscriber station is configured by the base station to transmit ACK/NACK using two uplink transmit antenna ports and channel selection with PUCCH format 1B, the configuration of two uplink transmit antenna ports is overridden and the modulation symbol is mapped to only one PUCCH on one transmit antenna port. If the subscriber station is configured by the base station to transmit ACK/NACK using two uplink transmit antenna ports and PUCCH format 1A/1B, the modulation symbol is mapped onto two uplink transmit antenna ports on two PUCCHs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station, comprising:
   receive path circuitry configured to receive an acknowledgement from a subscriber station configured to transmit the acknowledgement using two antenna ports,
   wherein if the subscriber station is configured to transmit the acknowledgement with channel selection, the acknowledgement is transmitted using one antenna port and one modulation symbol mapped in one physical uplink control channel (PUCCH) resource selected from a plurality of PUCCH resources.

2. The base station of claim 1, wherein if the subscriber station is configured to transmit the acknowledgement with channel selection, both the modulation symbol and the selection of the one PUCCH resource from the plurality of PUCCH resources convey information of multiple acknowledgement bits.

3. The base station of claim 1, wherein if the subscriber station is configured to transmit the acknowledgement using one antenna port with channel selection and PUCCH format 1B, the PUCCH resource on which the modulation symbol is transmitted is selected based at least partly upon a channel selection mapping table.

4. The base station of claim 1, wherein if the subscriber station is configured to transmit the acknowledgement using two antenna port with PUCCH format 1B, the PUCCH resources on which the modulation symbol is transmitted are selected based at least partly upon a channel selection mapping table and a resource index determined using a number of uplink control channels allocated for the acknowledgement of the subscriber station and a number of acknowledgement bits.

5. A method, comprising:
   receiving, at a base station, an acknowledgement from a subscriber station configured to transmit the acknowledgement using two antenna ports,
   wherein if the subscriber station is configured to transmit the acknowledgement with channel selection, the acknowledgement is transmitted using one antenna port and one modulation symbol mapped in one physical uplink control channel (PUCCH) resource selected from a plurality of PUCCH resources.

6. The method of claim 5, wherein if the subscriber station is configured to transmit the acknowledgement with channel selection, both the modulation symbol and the selection of the one PUCCH resource from the plurality of PUCCH resources conveys information of multiple acknowledgement bits.

7. The method of claim 5, wherein if the subscriber station is configured to transmit the acknowledgement using one antenna port with channel selection and PUCCH format 1B, the PUCCH resource on which the modulation symbol is transmitted is selected based at least partly upon a channel selection mapping table.

8. The method of claim 5, wherein if the subscriber station is configured to transmit the acknowledgement using two antenna port with PUCCH format 1B, the PUCCH resources on which the modulation symbol is transmitted are selected based at least partly upon a channel selection mapping table and a resource index determined using a number of uplink control channels allocated for the acknowledgement of the subscriber station and a number of acknowledgement bits.

9. A user equipment, comprising:
   transmit path circuitry configured to transmit an acknowledgement from the user equipment to a base station using two antenna ports,
   wherein if the user equipment is configured to transmit the acknowledgement with channel selection, the acknowledgement is transmitted using one antenna port and one modulation symbol mapped in one physical uplink control channel (PUCCH) resource selected from a plurality of PUCCH resources.

10. The user equipment of claim 9, wherein if the user equipment is configured to transmit the acknowledgement with channel selection, both the modulation symbol and the selection of the one PUCCH resource from the plurality of PUCCH resources conveys information of multiple acknowledgement bits.

11. The user equipment of claim 9, wherein if the user equipment is configured to transmit the acknowledgement using one antenna port with channel selection and PUCCH format 1B, the PUCCH resource on which the modulation symbol is transmitted is selected based at least partly upon a channel selection mapping table.

12. The user equipment of claim 9, wherein if the user equipment is configured to transmit the acknowledgement using two antenna port with PUCCH format 1B, the PUCCH resources on which the modulation symbol is transmitted are selected based at least partly upon a channel selection mapping table and a resource index determined using a number of uplink control channels allocated for the acknowledgement of the user equipment and a number of acknowledgement bits.

13. A method, comprising:
   transmitting an acknowledgement from a user equipment to a base station using two antenna ports, wherein if the user equipment is configured to transmit the acknowledgement with channel selection, the acknowledgement is transmitted using one antenna port and one modulation symbol mapped in one physical uplink control channel (PUCCH) resource selected from a plurality of PUCCH resources.

14. The method of claim 13, wherein if the user equipment is configured to transmit the acknowledgement with channel selection, both the modulation symbol and the selection of the one PUCCH resource from the plurality of PUCCH resources conveys information of multiple acknowledgement bits.

15. The method of claim 13, wherein if the user equipment is configured to transmit the acknowledgement using one antenna port with channel selection and PUCCH format 1B, the PUCCH resource on which the modulation symbol is transmitted is selected based at least partly upon a channel selection mapping table.

16. The method of claim 13, wherein if the user equipment is configured to transmit the acknowledgement using two antenna port with PUCCH format 1B, the PUCCH resources on which the modulation symbol is transmitted are selected based at least partly upon a channel selection mapping table and a resource index determined using a number of uplink control channels allocated for the acknowledgement of the user equipment and a number of acknowledgement bits.

* * * * *